United States Patent
Rahman et al.

(10) Patent No.: US 11,750,258 B2
(45) Date of Patent: Sep. 5, 2023

(54) METHOD AND APPARATUS FOR CSI REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 17/185,823

(22) Filed: Feb. 25, 2021

(65) Prior Publication Data

US 2021/0297134 A1 Sep. 23, 2021

Related U.S. Application Data

(60) Provisional application No. 63/152,735, filed on Feb. 23, 2021, provisional application No. 63/030,040, filed on May 26, 2020, provisional application No. 63/028,451, filed on May 21, 2020, provisional application No. 62/991,303, filed on Mar. 18, 2020, (Continued)

(51) Int. Cl.
*H04B 7/06* (2006.01)
*H04L 5/00* (2006.01)

(52) U.S. Cl.
CPC ......... *H04B 7/0626* (2013.01); *H04B 7/0632* (2013.01); *H04B 7/0639* (2013.01); *H04L 5/0092* (2013.01)

(58) Field of Classification Search
CPC .. H04B 7/0626; H04B 7/0632; H04B 7/0639; H04B 7/0478; H04B 7/0482; H04L 5/0092; H04L 5/0057
See application file for complete search history.

(56) References Cited

U.S. PATENT DOCUMENTS

| 8,983,001 | B2 | 3/2015 | Frenne et al. |
| 9,503,924 | B2 * | 11/2016 | Geirhofer ............... H04B 7/066 |
| 10,511,411 | B2 * | 12/2019 | Han ...................... H04L 1/0026 |

(Continued)

FOREIGN PATENT DOCUMENTS

| WO | 2016/122109 A1 | 8/2016 | |
| WO | WO-2020151644 A1 * | 7/2020 | ........... H04B 7/0417 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

(Continued)

*Primary Examiner* — Habte Mered

(57) ABSTRACT

A method for operating a user equipment (UE) comprises receiving channel state information (CSI) reporting configuration information including a CSI reporting band and a frequency granularity of CSI reporting, where the CSI reporting band is within a bandwidth part (BWP) comprising M physical resource blocks (PRBs), and the frequency granularity of CSI reporting is based on whether M<N, where N is a threshold; identifying the frequency granularity of CSI reporting; generating a CSI report with the identified frequency granularity, wherein the CSI report includes at least one of a precoding matrix indicator (PMI) and a channel quality indicator (CQI); and transmitting the CSI report over an uplink (UL) channel.

20 Claims, 13 Drawing Sheets

Related U.S. Application Data provisional application No. 62/988,629, filed on Mar. 12, 2020.

(56) References Cited

U.S. PATENT DOCUMENTS

| | | | |
|---|---|---|---|
| 2014/0071848 | A1 | 3/2014 | Park et al. |
| 2015/0327119 | A1* | 11/2015 | Ko .................... H04L 5/001 370/252 |
| 2019/0199420 | A1* | 6/2019 | Faxér ............. H04W 72/0413 |
| 2019/0222354 | A1* | 7/2019 | Han ................. H04L 5/0048 |
| 2021/0367652 | A1* | 11/2021 | Wernersson ......... H04B 7/0634 |
| 2021/0409086 | A1* | 12/2021 | Yerramalli ............ H04W 76/27 |
| 2022/0103209 | A1* | 3/2022 | Hao .................. H04L 5/0057 |
| 2022/0109480 | A1* | 4/2022 | Hao .................. H04B 7/0639 |
| 2022/0109481 | A1* | 4/2022 | Chen ................. H04B 7/0456 |
| 2022/0271814 | A1* | 8/2022 | Hao .................. H04B 7/0456 |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

"3rd Generation Partnership Project; Technical Specification Group Radio Access Network; NR; Physical layer procedures for data (Release 16)", 3GPP TS 38.214 V16.4.0, Dec. 2020, 169 pages.

"3rd Generation Partnership Project; Technical Specification Group Radio Access Network; NR; Multiplexing and channel coding (Release 16)", 3GPP TS 38.212 V16.4.0, Dec. 2020, 152 pages.

"3rd Generation Partnership Project; Technical Specification Group Radio Access Network; NR; Physical layer procedures for control (Release 16)", 3GPP TS 38.213 V16.4.0, Dec. 2020, 181 pages.

International Search Report and Written Opinion of the International Searching Authority in connection with International Application No. PCT/KR2021/002993 dated Jun. 30, 2021, 12 pages.

\* cited by examiner

METHOD AND APPARATUS FOR CSI REPORTING

CROSS-REFERENCE TO RELATED APPLICATIONS AND CLAIM OF PRIORITY

The present application claims priority to U.S. Provisional Patent Application No. 62/988,629, filed on Mar. 12, 2020, U.S. Provisional Patent Application No. 62/991,303, filed on Mar. 18, 2020, U.S. Provisional Patent Application No. 63/028,451, filed on May 21, 2020, U.S. Provisional Patent Application No. 63/030,040, filed on May 26, 2020, and U.S. Provisional Patent Application No. 63/152,735, filed on Feb. 23, 2021. The content of the above-identified patent documents is incorporated herein by reference.

TECHNICAL FIELD

The present disclosure relates generally to wireless communication systems and more specifically to channel state information (CSI) reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive channel state information (CSI) reporting configuration information including a CSI reporting band and a frequency granularity of CSI reporting, where the CSI reporting band is within a bandwidth part (BWP) comprising M physical resource blocks (PRBs), and the frequency granularity of CSI reporting is based on whether $M<N$, where N is a threshold. The UE further includes a processor operably coupled to the transceiver. The processor, based on the CSI reporting configuration information, is configured to identify the frequency granularity of CSI reporting, and generate a CSI report with the identified frequency granularity, wherein the CSI report includes at least one of a precoding matrix indicator (PMI) and a channel quality indicator (CQI). The transceiver is further configured to transmit the CSI report over an uplink (UL) channel.

In another embodiment, a BS in a wireless communication system is provided. The BS includes a processor configured to generate channel state information (CSI) reporting configuration information including a CSI reporting band and a frequency granularity of CSI reporting, wherein: the CSI reporting band is within a bandwidth part (BWP) comprising M physical resource blocks (PRBs), and the frequency granularity of CSI reporting is based on whether $M<N$, where N is a threshold. The BS further includes a transceiver operably coupled to the processor. The transceiver is configured to: transmit the CSI reporting configuration information that includes the CSI reporting band and the frequency granularity of CSI reporting; and receive, over an uplink (UL) channel, a CSI report; wherein: the CSI report is based on the frequency granularity of CSI reporting, and the CSI report includes at least one of a precoding matrix indicator (PMI) and a channel quality indicator (CQI).

In yet another embodiment, a method for operating a UE is provided. The method comprises: receiving channel state information (CSI) reporting configuration information including a CSI reporting band and a frequency granularity of CSI reporting, where the CSI reporting band is within a bandwidth part (BWP) comprising M physical resource blocks (PRBs), and the frequency granularity of CSI reporting is based on whether $M<N$, where N is a threshold; identifying the frequency granularity of CSI reporting; generating a CSI report with the identified frequency granularity, wherein the CSI report includes at least one of a precoding matrix indicator (PMI) and a channel quality indicator (CQI); and transmitting the CSI report over an uplink (UL) channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
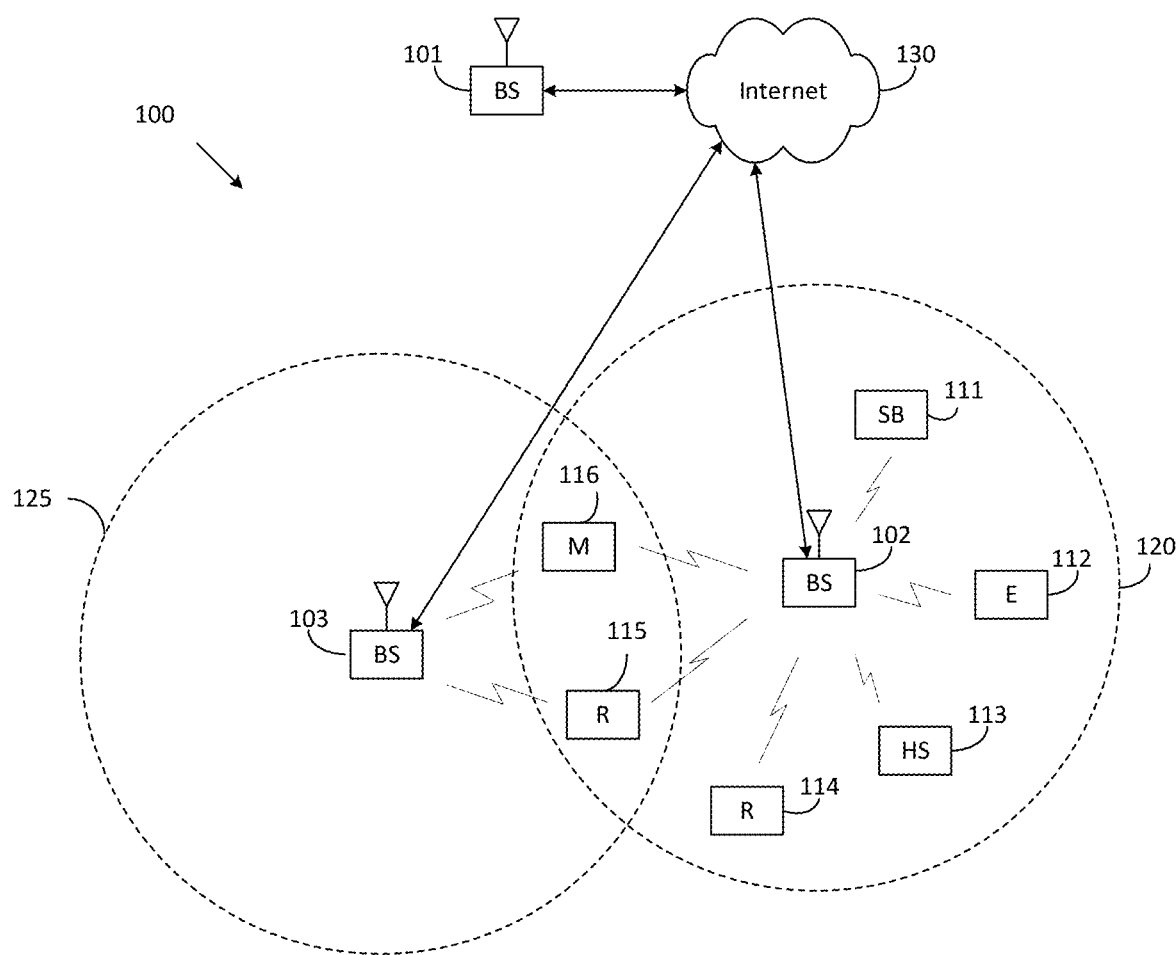
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.4.0, "E-UTRA, Physical channels and modulation" (herein "REF 1"); 3GPP TS 36.212 v16.4.0, "E-UTRA, Multiplexing and Channel coding" (herein "REF 2"); 3GPP TS 36.213 v16.4.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TR 22.891 v14.2.0 (herein "REF 6"); 3GPP TS 38.212 v16.4.0, "E-UTRA, NR, Multiplexing and channel coding" (herein "REF 7"); 3GPP TS 38.214 v16.4.0, "E-UTRA, NR, Physical layer procedures for data" (herein "REF 8"); and 3GPP TS 38.213 v16.4.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
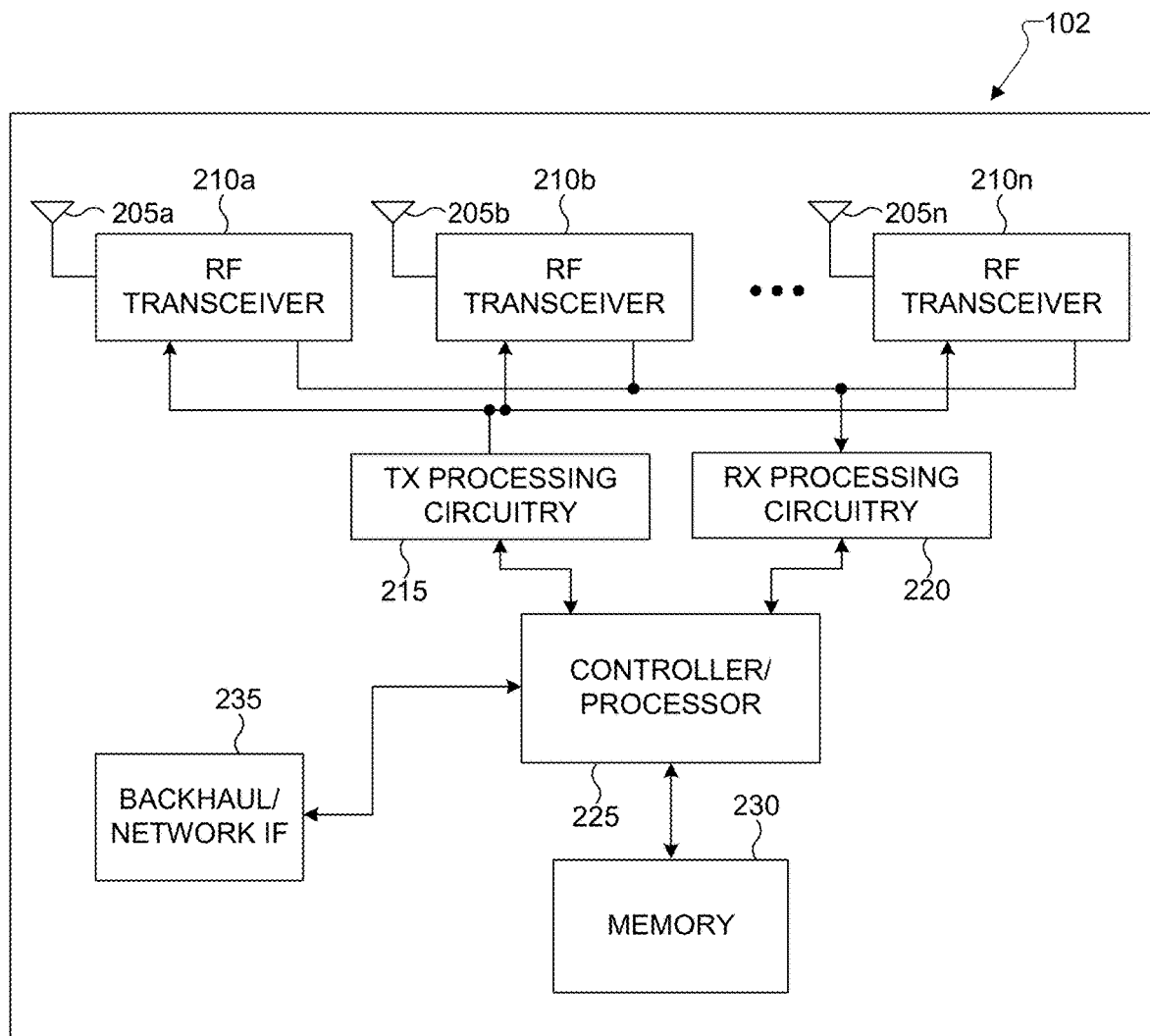
FIG. 2 illustrates an example gNB according to embodiments of the present disclosure.
Figure 3:
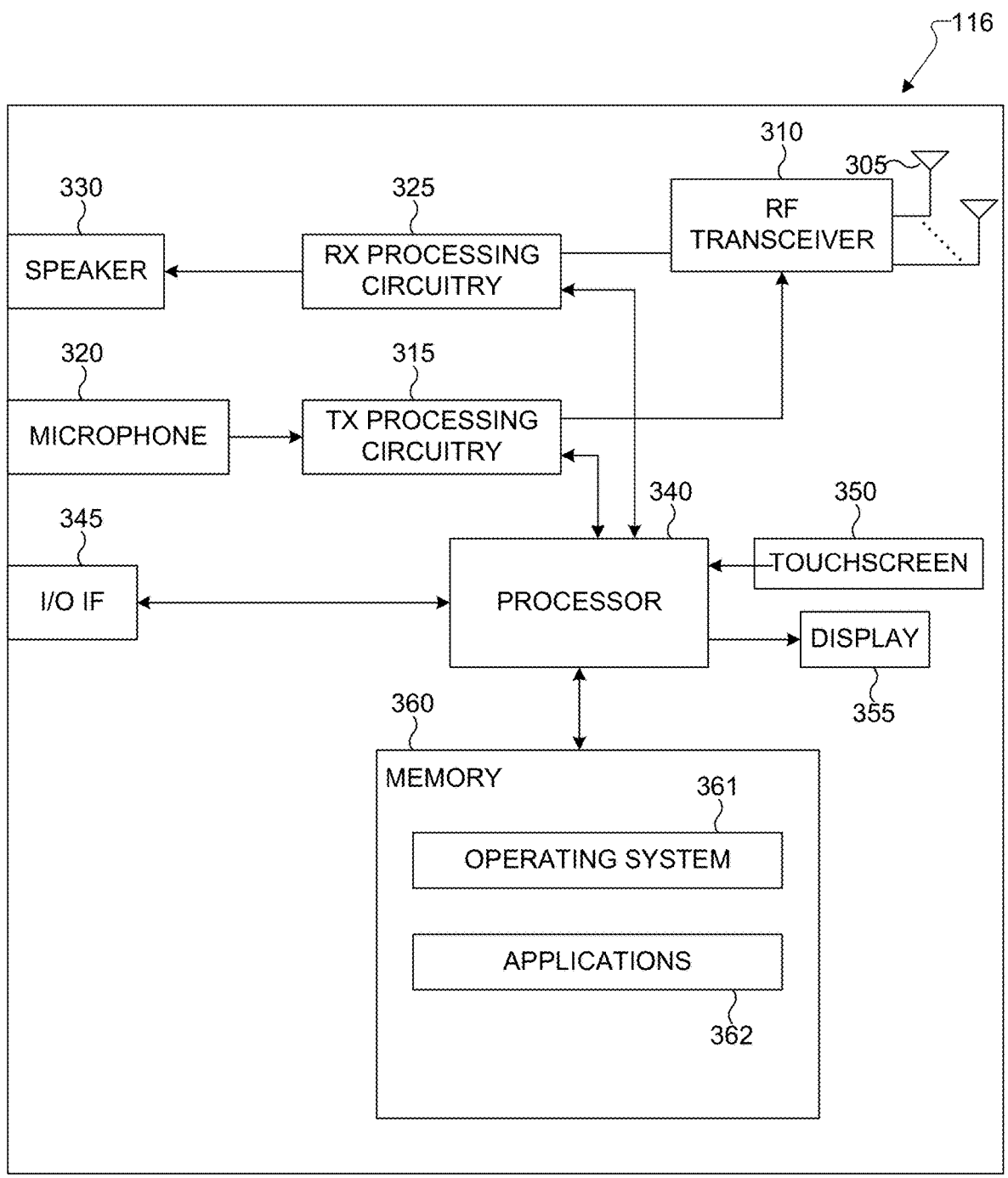
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving channel state information (CSI) reporting configuration information including a CSI reporting band and a frequency granularity of CSI reporting, where the CSI reporting band is within a bandwidth part (BWP) comprising M physical resource blocks (PRBs), and the frequency granularity of CSI reporting is based on whether M<N, where N is a threshold; identifying the frequency granularity of CSI reporting; generating a CSI report with the identified frequency granularity, wherein the CSI report includes at least one of a precoding matrix indicator (PMI) and a channel quality indicator (CQI); and transmitting the CSI report over an uplink (UL) channel. One or more of the gNBs 101-103 includes circuitry, programing, or a combination thereof, for generating channel state information (CSI) reporting configuration information including a CSI reporting band and a frequency granularity of CSI reporting, wherein: the CSI reporting band is within a bandwidth part (BWP) comprising M physical resource blocks (PRBs), and the frequency granularity of CSI reporting is based on whether M<N, where N is a threshold; transmitting the CSI reporting configuration information that includes the CSI reporting band and the frequency granularity of CSI reporting; and receiving, over an uplink (UL) channel, a CSI report; wherein: the CSI report is based on the frequency granularity of CSI reporting, and the CSI report includes at least one of a precoding matrix indicator (PMI) and a channel quality indicator (CQI).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving channel state information (CSI)

reporting configuration information including a CSI reporting band and a frequency granularity of CSI reporting, where the CSI reporting band is within a bandwidth part (BWP) comprising M physical resource blocks (PRBs), and the frequency granularity of CSI reporting is based on whether M<N, where N is a threshold; identifying the frequency granularity of CSI reporting; generating a CSI report with the identified frequency granularity, wherein the CSI report includes at least one of a precoding matrix indicator (PMI) and a channel quality indicator (CQI); and transmitting the CSI report over an uplink (UL) channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
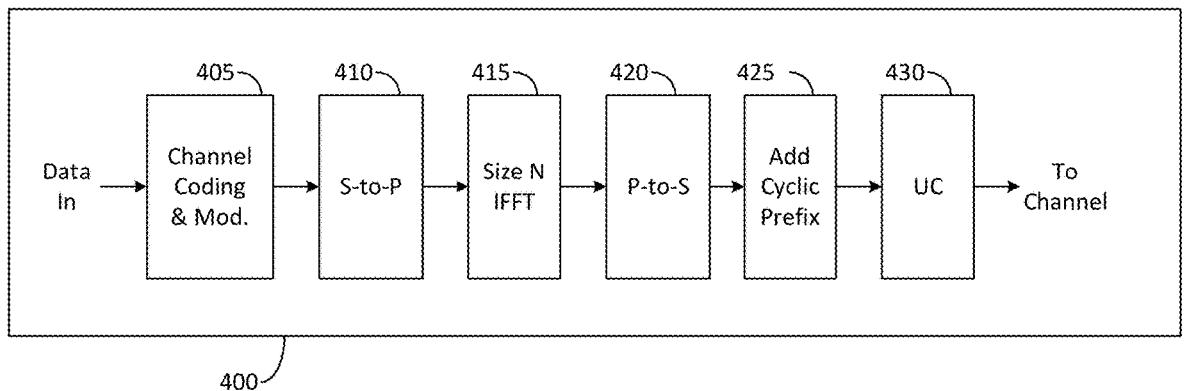
FIG. 4A illustrates a high-level diagram of an orthogonal frequency division multiple access transmit path according to embodiments of the present disclosure.
Figure 4B:
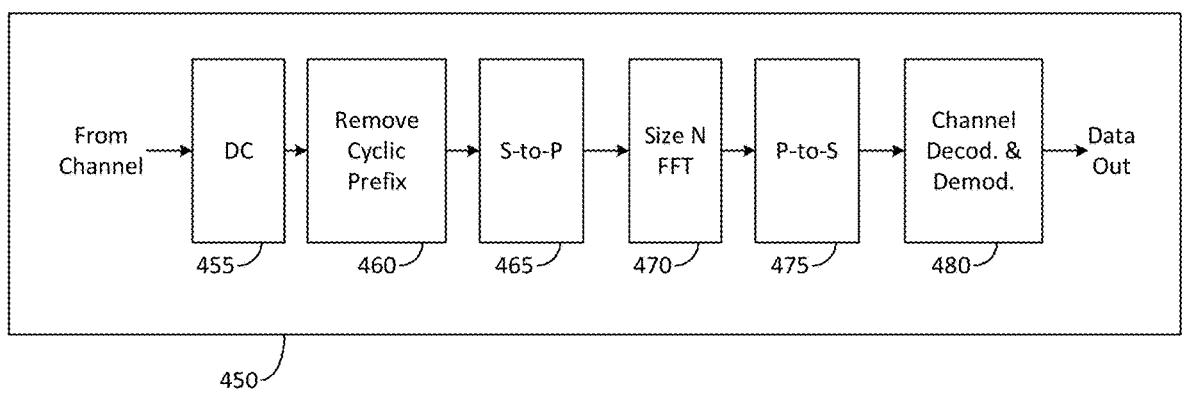
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+y \cdot N_{EPDCCH})\bmod D$ RBs for a total of $Z=O_F+\lfloor(n_{s0}+y \cdot N_{EPDCCH})/D\rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
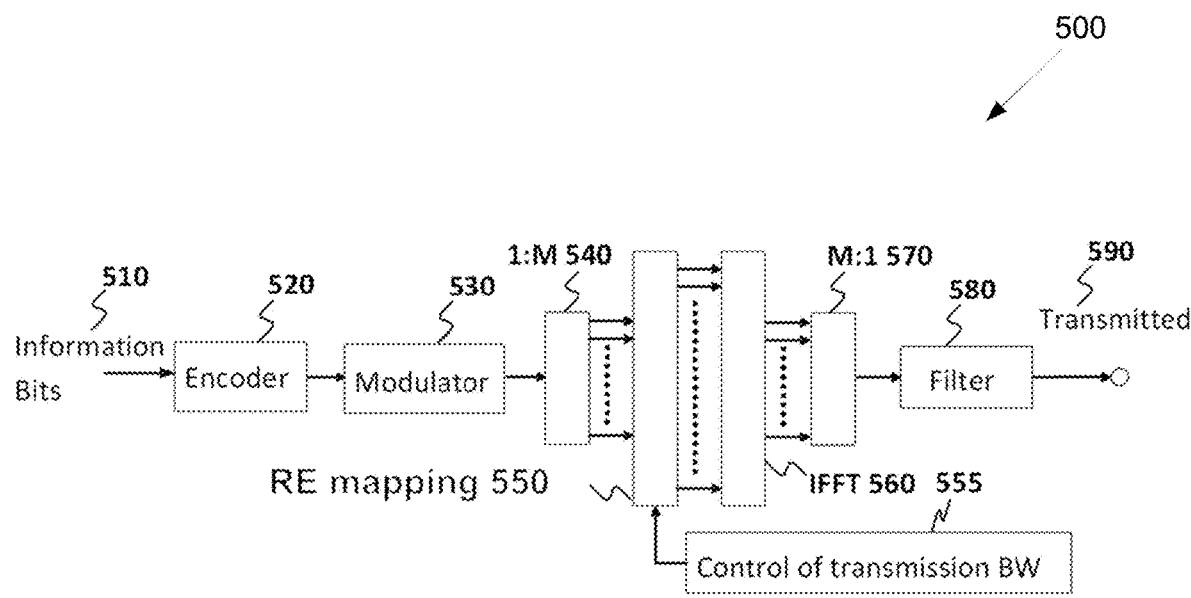
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
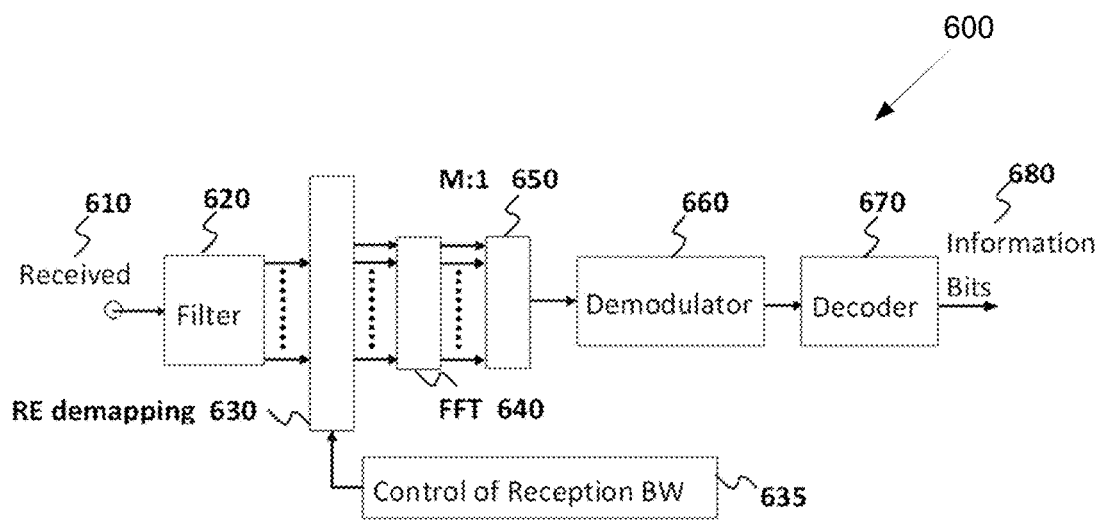
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
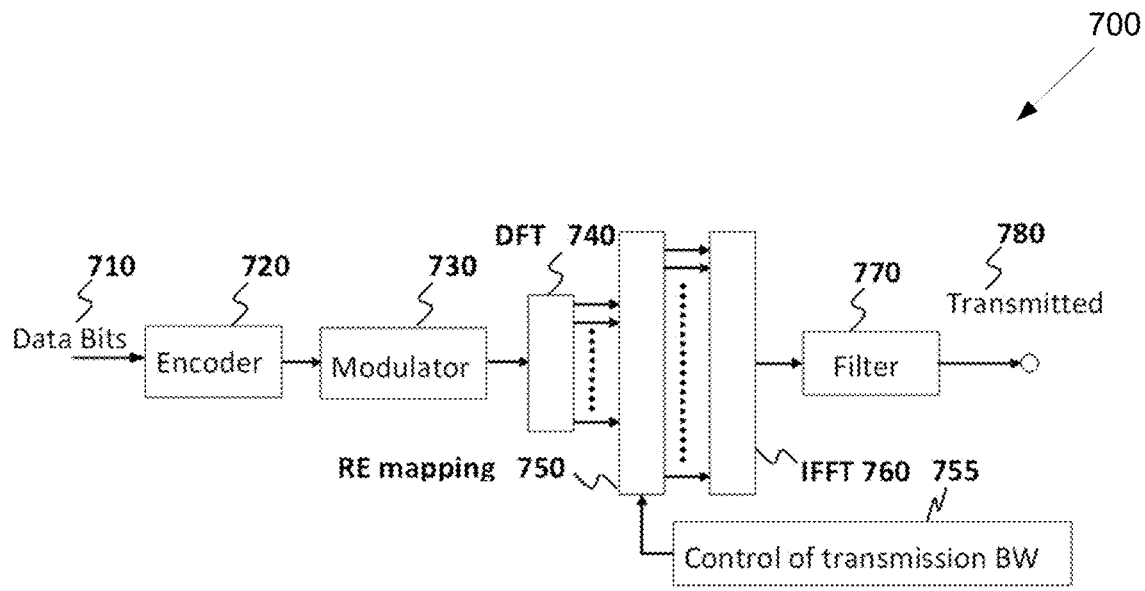
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
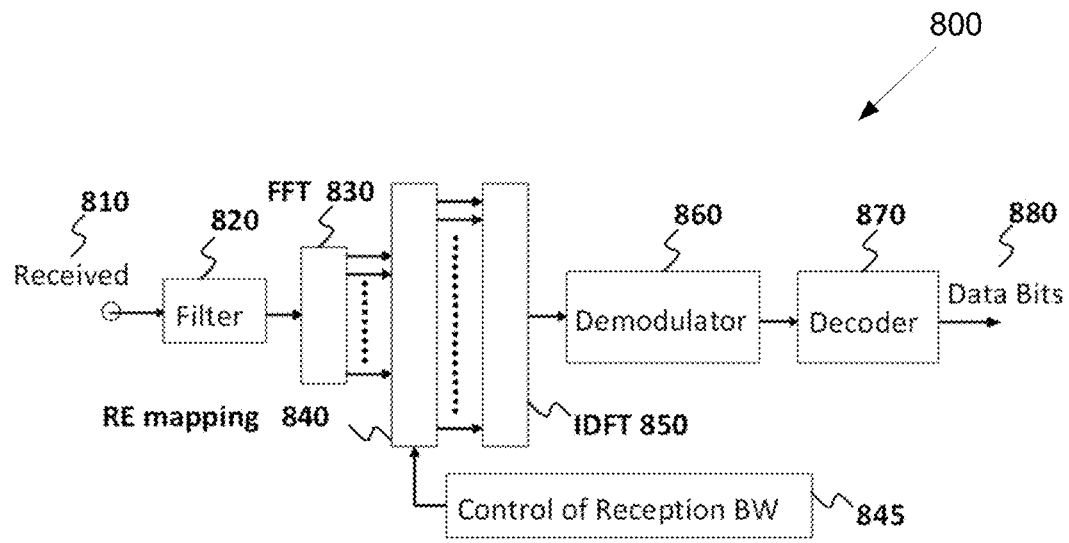
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km' with less stringent the reliability, data rate, and latency requirements.

In order for the 5G network to support such diverse services with different quality of services (QoS), one scheme has been identified in 3GPP specification, called network slicing.

To utilize PHY resources efficiently and multiplex various slices (with different resource allocation schemes, numerologies, and scheduling strategies) in DL-SCH, a flexible and self-contained frame or subframe design is utilized.

Figure 9:
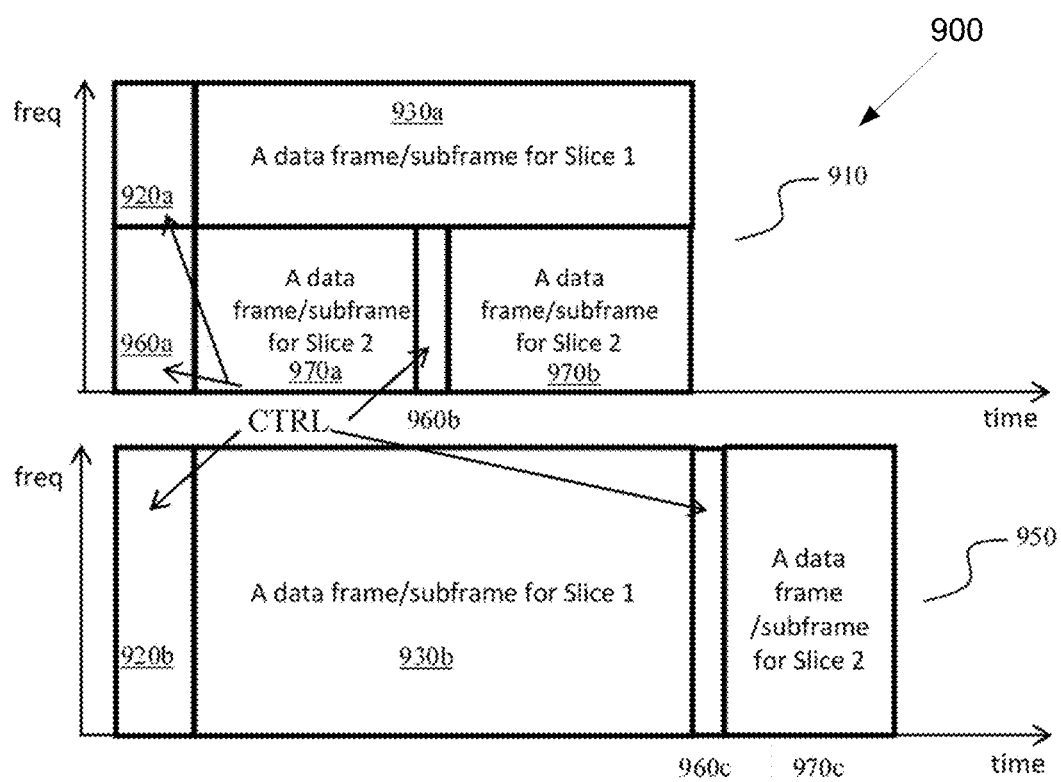
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
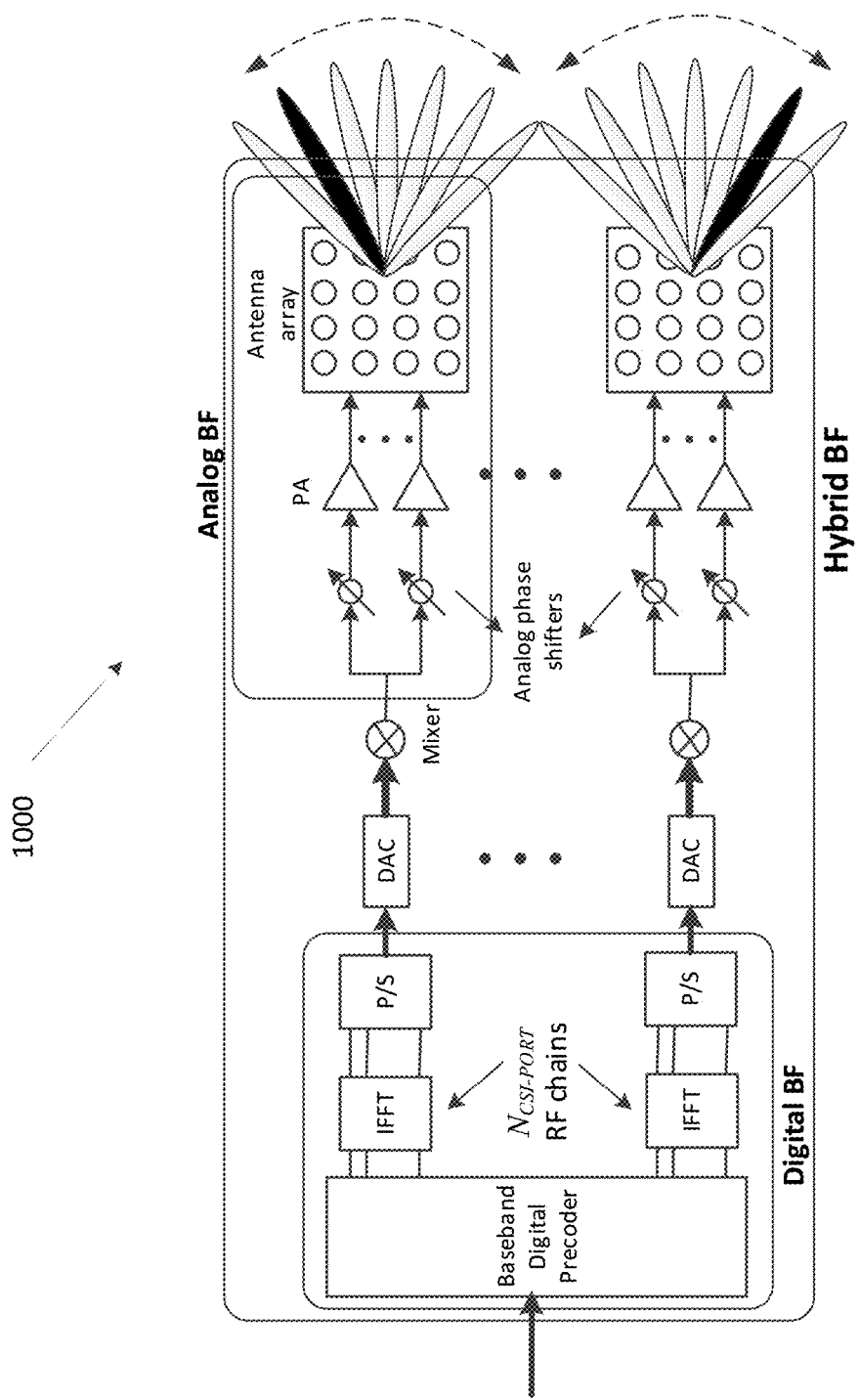
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

Figure 11:
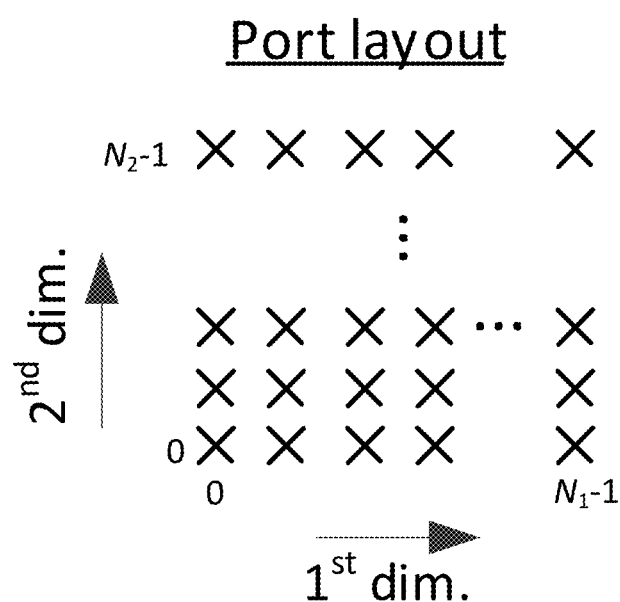
FIG. 11 illustrates an antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 12:
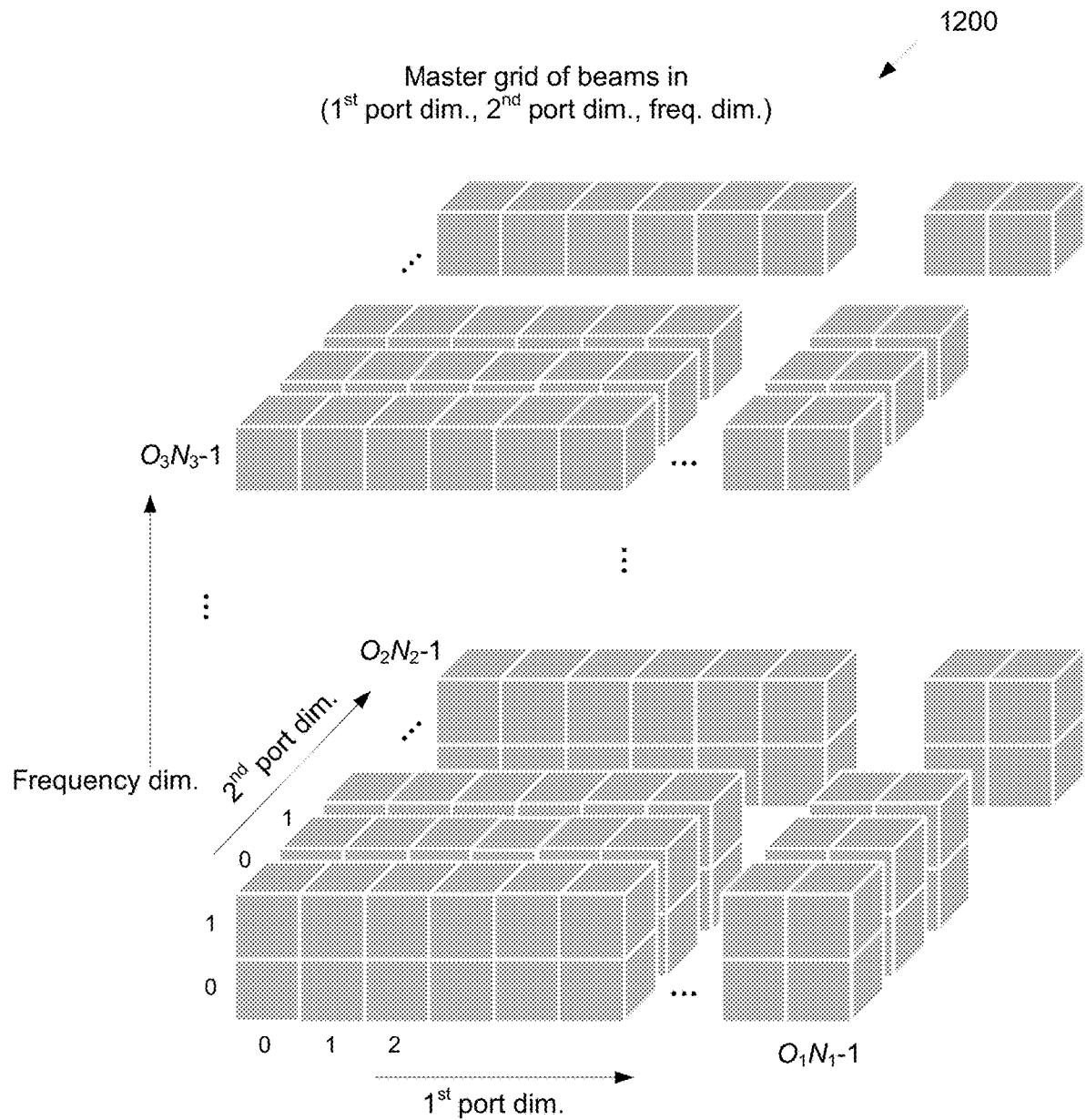
FIG. 12 illustrates a 3D grid of oversampled DFT beams according to embodiments of the present disclosure.

FIG. 12 illustrates a 3D grid 1200 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to {2, 4, 8}. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all subbands (SBs) and for a given layer l=1, . . . , v, where v is the associated RI value, is given by either $$W^l = AC_lB^H = \qquad (Eq.\ 1)$$

$$[a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

$$\sum_{f=0}^{M-1} \sum_{k=0}^{L-1} C_{l,i,f}(a_i b_f^H) = \sum_{k=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H = \qquad (Eq.\ 2)$$

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H =$$

-continued $$\begin{bmatrix} \sum_{f=0}^{M-1} \sum_{k=0}^{L-1} c_{l,i,f}(a_i b_f^H) \\ \sum_{f=0}^{M-1} \sum_{k=0}^{L-1} c_{l,i+L,f}(a_i b_f^H) \end{bmatrix},$$

where
- $N_1$ is a number of antenna ports in a first antenna port dimension (having the same antenna polarization),
- $N_2$ is a number of antenna ports in a second antenna port dimension (having the same antenna polarization),
- $N_3$ is a number of SBs for PMI reporting or number of FD units or number of FD components (that comprise the CSI reporting band) or a total number of precoding matrices indicated by the PMI,
- $a_i$ is a $2N_1N_2 \times 1$ (Eq. 1) or $N_1N_2 \times 1$ (Eq. 2) column vector,
- $b_k$ is a $N_3 \times 1$ column vector,
- $c_{l,i,m}$ is a complex coefficient.

In the rest of the disclosure, the terms "SB for PMI reporting" and "FD unit for PMI reporting" are used interchangeably since they are equivalent.

In a variation, when reports a subset $K < 2LM$ coefficients (where K is either fixed, configured by the gNB or reported by the UE), then the coefficient $c_{l,i,m}$ in precoder equations Eq. 1 or Eq. 2 is replaced with $v_{l,i,m} \times c_{l,i,m}$, where
- $v_{l,i,m} = 1$ if the coefficient $c_{l,i,m}$ is non-zero, hence reported by the UE.
- $v_{l,i,m} = 0$ otherwise (i.e., $c_{l,i,m}$ is zero, hence not reported by the UE).

The indication whether $v_{l,i,m} = 1$ or 0 is reported by the UE.

In a variation, the precoder equations Eq. 1 or Eq. 2 are respectively generalized to $$W^l = \sum_{i=0}^{L-1} \sum_{m=0}^{M_i-1} c_{l,i,m}(a_i b_{i,m}^H) \quad \text{(Eq. 3)}$$

and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}, \quad \text{(Eq. 4)}$$

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($v=R$), the pre-coding matrix is given by $$W^{(R)} = \frac{1}{\sqrt{R}}[W^1 \ W^2 \ \ldots \ W^R].$$

Eq. 2 is assumed in the rest of the disclosure. The embodiments of the disclosure, however, are general and are also application to Eq. 1, Eq. 3, and Eq. 4.

Here $L \leq 2N_1N_2$ and $M \leq N_3$. If $L = 2N_1N_2$, then A is an identity matrix, and hence not reported. Likewise, if $M = N_3$, then B is an identity matrix, and hence not reported. Assuming $L < 2N_1N_2$, in an example, to report columns of A, the oversampled DFT codebook is used. For instance, $a_i = v_{l,m}$, where the quantity $v_{l,m}$ is given by $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Similarly, assuming $M < N_3$, in an example, to report columns of B, the oversampled DFT codebook is used. For instance, $b_k = w_k$, where the quantity $w_k$ is given by $$w_k = \begin{bmatrix} 1 & e^{j\frac{2\pi k}{O_3 N_3}} & \ldots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'typeII-PortSelection-r16' for an enhanced Type II CSI reporting with port selection in which the pre-coders for all SBs and for a given layer $l = 1, \ldots, v$, where v is the associated RI value, is given by $W^l = AC_l B^H$, where $N_1$, $N_2$, $N_3$, and $c_{l,i,m}$ are defined as above except that the matrix A comprises port selection vectors. For instance, the L antenna ports per polarization or column vectors of A are selected by the index $q_1$, where $q_1 \in$ $$\left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits}),$$

and the value of d is configured with the higher layer parameter PortSelectionSamplingSize, where $d \in \{1,2,3,4\}$ and $$d \leq \min\left(\frac{P_{CSI-RS}}{2}, L\right).$$

To report columns of A, the port selection vectors are used, For instance, $a_i = v_m$, where the quantity $v_m$ is a $$\frac{P_{CSI-RS}}{2}$$

element column vector containing a value of 1 in element $$\left(m \mod \frac{P_{CSI-RS}}{2}\right)$$

and zeros elsewhere (where the first element is element 0).

On a high level, a precoder $W^l$ can be described as follows.

$$W^l = A C_l B^H = W_1 \tilde{W}_2 W_f^H, \qquad (5)$$

where $A = W_1$ corresponds to the Rel. 15 $W_1$ in Type II CSI codebook [REF8], i.e., $$W_1 = \begin{bmatrix} A & 0 \\ 0 & A \end{bmatrix}$$

and $B = W_f$. The $C_l = \tilde{W}_2$ matrix consists of all the required linear combination coefficients (e.g., amplitude and phase or real or imaginary). Note that the coefficients matrix $\tilde{W}_2$ comprises 2LM coefficients.

Let the total (sum) number of non-zero (NZ) coefficients (reported by the UE) across layers be $N_0 = \Sigma_{l=1}^{\nu} N_{0,l}$. Let (i*, m*) be the index of the strongest coefficient $c_{l,i^*,m^*}$ for layer l indicated by the SCI.

In embodiment A, the following quantization scheme is used to quantize/report amplitude of the $N_0 = K_{NZ}$ NZ coefficients. The UE reports the following for the quantization of the NZ coefficients in $\tilde{W}_2$ A $\lceil \log_2 X \rceil$-bit indicator for the strongest coefficient index (i*, m*). In one example, $X = K_{NZ}$. In another example, In one example, $X = 2L$.

Strongest coefficient $c_{l,i^*,m^*} = 1$ (hence its amplitude/phase are not reported)

Two antenna polarization-specific reference amplitudes:

For the polarization associated with the strongest coefficient $c_{l,i^*,m^*} = 1$, since the reference amplitude $p_{l,i,m}^{(1)} = 1$, it is not reported For the other polarization, reference amplitude $p_{l,i,m}^{(1)}$ is quantized to A bits.

In one example, A=4, and the 4-bit amplitude alphabet is $$\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\}.$$

For $\{c_{l,i,m}, (i, m) \neq (i^*, m^*)\}$:

For each polarization, differential amplitudes $p_{l,i,m}^{(2)}$ of the coefficients calculated relative to the associated polarization-specific reference amplitude and quantized to B bits.

In one example, B=3, and the 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,m}$ is given by $p_{l,i,m}^{(1)} \times p_{l,i,m}^{(2)}$ and the coefficient is given by $$c_{l,i,m} = p_{ref}\left(\left\lfloor \frac{i}{L} \right\rfloor\right) \times p_{l,i,m}^{(2)} \times \varphi(l, m)$$

Note that $$p_{l,i,m}^{(1)} = p_{ref}\left(\left\lfloor \frac{i}{L} \right\rfloor\right).$$

In one alternative, "zero" in the 4-bit amplitude alphabet for the reference amplitude is removed and the associated code point is designated as "reserved" which implies that the associated code point is not used in reference amplitude reporting. For RI $\in \{2,3,4\}$, different layers are independently quantized.

Here the notation $\lfloor x \rfloor$ indicates a floor function which maps x to a smaller integer number a such that a is the largest integer such that a<x. Likewise, the notation $\lceil x \rceil$ a ceiling function which maps x to a larger integer number a such that a is the smallest integer such that x<a. Also, the notation |x| indicates the absolute value of x.

In embodiment B, each PMI value, indicating the components of the precoder or precoding matrix according the framework (5), corresponds to the codebook indices $i_1$ and $i_2$ where $$i_1 = \begin{cases} [i_{1,1} \; i_{1,2} \; i_{1,5} \; i_{1,6,1} \; i_{1,7,1} \; i_{1,8,1}] & \upsilon = 1 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2}] & \upsilon = 2 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3}] & \upsilon = 3 \\ [i_{1,1} \; i_{1,2} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \; i_{1,6,4} \; i_{1,7,4} \; i_{1,8,4}] & \upsilon = 4 \end{cases}$$

$$i_2 = \begin{cases} [i_{2,3,1} \; i_{2,4,1} \; i_{2,5,1}] & \upsilon = 1 \\ [i_{2,3,1} \; i_{2,4,1} \; i_{2,5,1} \; i_{2,3,2} \; i_{2,4,2} \; i_{2,5,2}] & \upsilon = 2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & \upsilon = 3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & \upsilon = 4 \end{cases}$$

where
- υ is the rank indicator (RI) value
- $i_{1,1}$ are the rotation factors for the SD basis (same as in Rel. 15 Type II CSI codebook)
- $i_{1,2}$ is the SD basis indicator (same as in Rel. 15 Type II CSI codebook)
- $i_{1,5}$ is the $M_{initial}$ indicator when $N_3>19$, indicating the intermediate FD basis set InS comprising 2M FD basis vectors
- $i_{1,6,l}$ is the FD basis indicator for layer l, indicating M FD basis vectors
- $i_{1,7,l}$ is the bitmap for layer l, indicating the location of non-zero (NZ) coefficients
- $i_{1,8,l}$ is the strongest coefficient indicator (SCI) for layer l, indicating location of the strongest coefficient=1
- $i_{2,3,l}$ are the reference amplitudes ($p_{l,0}^{(1)}$) for layer l, indicating the reference amplitude coefficient for the weaker polarization
- $i_{2,4,l}$ is the matrix of the differential amplitude values ($p_{l,i,f}^{(2)}$) for layer l
- $i_{2,5,l}$ is the matrix of the phase values ($\varphi_{l,i,f}$) for layer l.

According to Section 5.2.2.2.5 of [REF8], for 4 antenna ports {3000, 3001, . . . 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16'

- The values of $N_1$ and $N_2$ are configured with the higher layer parameter n1-n2-codebookSubsetRestriction-r16. The supported configurations of ($N_1$, $N_2$) for a given number of CSI-RS ports and the corresponding values of ($O_1$, $O_2$) are given in Table 5.2.2.2.1-2. The number of CSI-RS ports, $P_{CSI-RS}$, is $2N_1N_2$;
- The values of L, β and $p_υ$ are determined by the higher layer parameter paramCombination-r16, where the mapping is given in Table 5.2.2.2.5-1;
- The UE is not expected to be configured with paramCombination-r16 equal to
  - 3, 4, 5, 6, 7, or 8 when $P_{CSI-RS}=4$,
  - 7 or 8 when $P_{CSI-RS}<32$
  - 7 or 8 when higher layer parameter typeII-RI-Restriction-r16 is configured with $r_i=1$ for any i>1.
  - 7 or 8 when R=2.

The parameter R is configured with the higher-layer parameter numberOfPMISubbandsPerCQISubband. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part according to Table 5.2.1.4-2, as follows:

When R=1:
  One precoding matrix is indicated by the PMI for each subband in csi-ReportingBand.
When R=2:
  For each subband in csi-ReportingBand that is not the first or last subband of a BWP, two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.
  For each subband in csi-ReportingBand that is the first or last subband of a BWP If $$(N_{BWP,i}^{start} \bmod N_{PRB}^{SB}) \geq \frac{N_{PRB}^{SB}}{2},$$

one precoding matrix is indicated by the PMI corresponding to the first subband. If $$(N_{BWP,i}^{start} \bmod N_{PRB}^{SB}) < \frac{N_{PRB}^{SB}}{2},$$

two precoding matrices are indicated by the PMI corresponding to the first subband: the first precoding matrix corresponds to the first $$\frac{N_{PRB}^{SB}}{2} - (N_{BWP,i}^{start} \bmod N_{PRB}^{SB})$$

PRBs of the first subband and the second precoding matrix corresponds to the last $$\frac{N_{PRB}^{SB}}{2}$$

PRBs of the first subband.
If $$(N_{BWP,i}^{start} + N_{BWP,i}^{size}) \bmod N_{PRB}^{SB} \leq \frac{N_{PRB}^{SB}}{2},$$

one precoding matrix is indicated by the PMI corresponding to the last subband. If $$(N_{BWP,i}^{start} + N_{BWP,i}^{size}) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$(N_{BWP,i}^{start} + N_{BWP,i}^{size}) \bmod N_{PRB}^{SB} - \frac{N_{PRB}^{SB}}{2}$$

PRBs of the last subband.

TABLE 1

Codebook parameter configurations for L, β and $p_v$

| paramCombination-r16 | L | $v \in \{1, 2\}$ $p_v$ | $v \in \{3, 4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

According to Section 5.2.1.4 of [REF8], for CSI reporting, a UE can be configured via higher layer signaling with one out of two possible subband sizes, where a subband is defined as $N_{PRB}^{SB}$ contiguous PRBs and depends on the total number of PRBs in the bandwidth part according to Table 2.

TABLE 2

Configurable subband sizes

| Bandwidth part (PRBs) | Subband size (PRBs) |
|---|---|
| <24 | N/A |
| 24-72 | 4, 8 |
| 73-144 | 8, 16 |
| 145-275 | 16, 32 |

As shown, if the bandwidth part (BWP) size comprises less than 24 PRBs, then the SB size is not available. This implies that the Rel. 16 enhanced Type II CSI reporting (as explained above) can't be configured to a UE for BWP size<24 PRBs. This is undesired for both network/gNB and UE implementations due to the following reasons. When a feature such as PMI calculation is implemented, the same algorithm is used irrespective of the BWP size. Therefore, there is no extra complexity associated with supporting the Rel. 16 enhanced codebooks for BWP size<24 PRBs if the UE is capable of such. Second, not supporting such codebooks for BWP<24 PRBs does not result in more UE power saving. Power saving is solely dictated by UE capability and, to a certain extent, network/gNB implementation (the gNB can opt for not configuring Rel. 16 enhanced Type-II for some capable UEs when BWP<24 PRBs). Third, introducing additional restrictions/conditions for the applicability of certain component(s) of CSI reporting amounts to worsening specification complexity and eventually some aspects (e.g., control flow) of UE implementation.

It is therefore preferable to support Rel. 16 enhanced Type II CSI for BWP<24 PRBs. In the rest of the disclosure, several example embodiments are provided to achieve this.

Component 1—WB CSI Reporting

In embodiment 1, a UE can be configured with a CSI reporting based on the Rel. 16 enhanced Type II (or enhanced Type II port selection) codebook for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$).

At least one of the following examples is used.

In one example 1.1, the WB CSI reporting for BWP<X PRBs (e.g., X=24) is supported for (or restricted to) rank 1 only.

The UE shall not report the RI value υ if BWP<X PRBs (e.g., X=24). Alternatively, the UE shall report the RI value υ according to the configured higher layer parameter typeII-RI-Restriction-r16 (or typeII-PortSelectionRI-Restriction-r16). The UE shall not report υ>z where z=4 if BWP>=X PRBs and z=1 if BWP<X PRBs (e.g., X=24).

The bitmap parameter typeII-RI-Restriction-r16 (or typeII-PortSelectionRI-Restriction-r16) for the rank restriction is absent or not provided (not configured). Alternatively, the UE doesn't expect to be configured with the bitmap parameter typeII-RI-Restriction-r16 (or typeII-PortSelectionRI-Restriction-r16) if BWP<X PRBs (e.g., X=24). Alternatively, the bitmap parameter typeII-RI-Restriction-r16 (or typeII-PortSelectionRI-Restriction-r16) for the rank restriction is provided (configured), but the UE doesn't use (hence ignores) it.

In one example 1.2, the WB CSI reporting for BWP<X PRBs (e.g., X=24) is restricted to (or supported for) rank 1 or 2 only.

The UE shall report the RI value υ according to the configured higher layer parameter typeII-RI-Restriction-r16 (or typeII-PortSelectionRI-Restriction-r16). The UE shall not report υ>z where z=4 if BWP>=X PRBs and z=2 if BWP<X PRBs (e.g., X=24).

The bitmap parameter typeII-RI-Restriction-r16 (or typeII-PortSelectionRI-Restriction-r16) for the rank restriction is provided (configured).

In one alternative, regardless of whether BWP>=X PRBs or BWP<X PRBs, the bitmap parameter typeII-RI-Restriction-r16 (or typeII-PortSelectionRI-Restriction-r16) forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with υ=i+1 layers.

In another alternative,
 when BWP>=X PRBs, the bitmap parameter typeII-RI-Restriction-r16 (or typeII-PortSelectionRI-Restriction-r16) forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with υ=i+1 layers.
 when BWP<X PRBs, the bitmap parameter typeII-RI-Restriction-r16 (or typeII-PortSelectionRI-Restriction-r16) forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with υ=i+1 layers.

In one example 1.3, the WB CSI reporting for BWP<X PRBs (e.g., X=24) is restricted to R=1. The parameter R is configured with the higher-layer parameter numberOfPMI-SubbandsPerCQISubband. This parameter controls the number of precoding matrices in each CQI subband (SB).

In one example 1.4, the WB CSI reporting for BWP<X PRBs (e.g., X=24) is restricted to rank 1 only and R=1 (i.e., a combination of example 1.1 and 1.3).

In example 1.5, the WB CSI reporting for BWP<X PRBs (e.g., X=24) is restricted to rank 1 or 2 only and R=1 (i.e., a combination of example 1.2 and 1.3).

In one example 1.6, the WB CSI reporting for BWP<X PRBs (e.g., X=24) is restricted to L=2 (i.e., paramCombination-r16=1 or 2). That is, the UE is not expected to be configured with paramCombination-r16 equal to 3, 4, 5, 6, 7, or 8 when BWP<X PRBs.

In one example 1.7, the WB CSI reporting for BWP<X PRBs (e.g., X=24) is restricted to rank 1 only and L=2 (i.e., a combination of example 1.1 and 1.6).

In one example 1.8, the WB CSI reporting for BWP<X PRBs (e.g., X=24) is restricted to rank 1 or 2 only and L=2 (i.e., a combination of example 1.2 and 1.6).

In one example 1.9, the WB CSI reporting for BWP<X PRBs (e.g., X=24) is restricted to L=2 or 4 (i.e., paramCombination-r16=1 to 6). That is, the UE is not expected to be configured with paramCombination-r16 equal to 7 or 8 when BWP<X PRBs.

In one example 1.10, the WB CSI reporting for BWP<X PRBs (e.g., X=24) is restricted to rank 1 only and L=2 or 4 (i.e., a combination of example 1.1 and 1.9).

In one example 1.11, the WB CSI reporting for BWP<X PRBs (e.g., X=24) is restricted to rank 1 or 2 only and L=2 or 4 (i.e., a combination of example 1.2 and 1.9).

In one example 1.12, the WB CSI reporting for BWP<X PRBs (e.g., X=24) is restricted to L=2 and $\beta=\frac{1}{2}$ (i.e., paramCombination-r16=2). That is, the UE is not expected to be configured with paramCombination-r16 equal to 1, 3, 4, 5, 6, 7, or 8 when BWP<X PRBs.

In one example 1.13, the WB CSI reporting for BWP<X PRBs (e.g., X=24) is restricted to rank 1 only and L=2 and $\beta=\frac{1}{2}$ (i.e., a combination of example 1.1 and 1.12).

In one example 1.14, the WB CSI reporting for BWP<X PRBs (e.g., X=24) is restricted to rank 1 or 2 only and L=2 and 3=(i.e., a combination of example 1.2 and 1.12).

In one example 1.15, the WB CSI reporting for BWP<X PRBs (e.g., X=24) is restricted to L=2 or 4 and $\beta=\frac{1}{2}$ or $\frac{3}{4}$ (i.e., paramCombination-r16=2, 4, 5, 6). That is, the UE is not expected to be configured with paramCombination-r16 equal to 1, 3, 7, or 8 when BWP<X PRBs.

In one example 1.16, the WB CSI reporting for BWP<X PRBs (e.g., X=24) is restricted to rank 1 only and L=2 or 4 and $\beta=\frac{1}{2}$ or $\frac{3}{4}$ (i.e., a combination of example 1.1 and 1.15).

In one example 1.17, the WB CSI reporting for BWP<X PRBs (e.g., X=24) is restricted to rank 1 or 2 only and L=2 or 4 and $\beta=\frac{1}{2}$ or $\frac{3}{4}$ (i.e., a combination of example 1.2 and 1.15).

In one example 1.18, the WB CSI reporting for BWP<X PRBs (e.g., X=24) is restricted to $\beta=\frac{1}{2}$ or $\frac{3}{4}$ (i.e., paramCombination-r16=2, 4, 5, 6, 7, 8). That is, the UE is not expected to be configured with paramCombination-r16 equal to 1 or 3 when BWP<X PRBs.

In one example 1.19, the WB CSI reporting for BWP<X PRBs (e.g., X=24) is restricted to rank 1 only and $\beta=\frac{1}{2}$ or $\frac{3}{4}$ and $\beta=\frac{1}{2}$ or $\frac{3}{4}$ (i.e., a combination of example 1.1 and 1.18).

In one example 1.20, the WB CSI reporting for BWP<X PRBs (e.g., X=24) is restricted to rank 1 or 2 only and $\beta=\frac{1}{2}$ or $\frac{3}{4}$ (i.e., a combination of example 1.2 and 1.18).

In one example 1.21, the WB CSI reporting for BWP<X PRBs (e.g., X=24) is restricted to paramCombination-r16=2 to 8. That is, the UE is not expected to be configured with paramCombination-r16 equal to 1 when BWP<X PRBs.

In one example 1.22, the WB CSI reporting for BWP<X PRBs (e.g., X=24) is restricted to rank 1 only and L=2 and $\beta=\frac{1}{2}$ (i.e., a combination of example 1.1 and 1.21).

In one example 1.23, the WB CSI reporting for BWP<X PRBs (e.g., X=24) is restricted to rank 1 or 2 only and L=2 and $\beta=\frac{1}{2}$ (i.e., a combination of example 1.2 and 1.21).

In one example 1.24, in addition to the restriction in example 1.7 through example 1.23, the R value is also restricted to R=1 (i.e., a combination of one of example 1.7 through 1.23 and one of example 1.3 through 1.5).

In one example 1.25, the WB CSI reporting for BWP<X PRBs (e.g., X=24) is restricted to $N_{CSIRS} \leq p$, where $N_{CSIRS}$ is a number of CSI-RS antenna ports and p is fixed, for example to 2 or 4 or 8. Alternatively, the WB CSI reporting for BWP<X PRBs (e.g., X=24) is restricted to $N_{CSIRS} \in S$, where $N_{CSIRS}$ is a number of CSI-RS antenna ports and S is a fixed set, for example to {2} or {2,4} or {2,4,8}.

In one example 1.26, in addition to the restriction in example 1.1 through example 1.24, the $N_{CSIRS}$ value is also restricted (i.e., a combination of one of example 1.1 through 1.24 and example 1.25).

In embodiment 1A, a UE can be configured with a CSI reporting based on the Rel. 15 Type I single panel codebook for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3$=1).

At least one of the following examples is used.

In one example 1A.1, the WB CSI reporting for BWP<X PRBs (e.g., X=24) is supported for (or restricted to) rank 1 only.

The UE shall not report the RI value υ if BWP<X PRBs (e.g., X=24). Alternatively, the UE shall report υ=1 (or shall not report υ>1) if BWP<X PRBs (e.g., X=24).

The bitmap parameter typeI-SinglePanel-ri-Restriction (or twoTX-CodebookSubsetRestriction for 2 antenna ports) for the rank restriction is absent or not provided (not configured). Alternatively, the UE doesn't expect to be configured with the bitmap parameter typeI-SinglePanel-ri-Restriction (or twoTX-CodebookSubsetRestriction for 2 antenna ports) if BWP<X PRBs (e.g., X=24). Alternatively, the bitmap parameter typeI-SinglePanel-ri-Restriction (or twoTX-CodebookSubsetRestriction for 2 antenna ports) for the rank restriction is provided (configured), but the UE doesn't use (hence ignores) it.

In one example 1A.2, the WB CSI reporting for BWP<X PRBs (e.g., X=24) is restricted to (or supported for) rank 1 or 2 only.

The UE shall report the RI value υ according to the configured higher layer parameter typeI-SinglePanel-ri-Restriction (or twoTX-CodebookSubsetRestriction for 2 antenna ports). The UE shall not report υ>2 if BWP<X PRBs (e.g., X=24).

The bitmap parameter typeI-SinglePanel-ri-Restriction (or twoTX-CodebookSubsetRestriction for 2 antenna ports) for the rank restriction is provided (configured).

In one alternative, regardless of whether BWP>=X PRBs or BWP<X PRBs, the bitmap parameter typeI-SinglePanel-ri-Restriction forms the bit sequence $r_7, \ldots, r_1, r_0$ where $r_0$ is the LSB and $r_7$ is the MSB. When $r_i$ is zero, $i \in \{0, 1, \ldots, 7\}$, PMI and RI reporting are not allowed to correspond to any precoder associated with υ=i+1 layers.

In another alternative,
when BWP>=X PRBs, the bitmap parameter typeI-SinglePanel-ri-Restriction forms the bit sequence $r_7, \ldots, r_1, r_0$ where $r_0$ is the LSB and $r_7$ is the MSB. When $r_i$ is zero, $i \in \{0, 1, \ldots, 7\}$, PMI and RI reporting are not allowed to correspond to any precoder associated with υ=i+1 layers.

when BWP<X PRBs, the bitmap parameter typeI-SinglePanel-ri-Restriction forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with $\upsilon = i+1$ layers.

In example 1A.3, the WB CSI reporting for BWP<X PRBs (e.g., X=24) is restricted to (or supported for) rank 1, 2, 3, or 4 only.

The UE shall report the RI value $\upsilon$ according to the configured higher layer parameter typeI-SinglePanel-ri-Restriction (or twoTX-CodebookSubsetRestriction for 2 antenna ports). The UE shall not report $\upsilon > 4$ if BWP<X PRBs (e.g., X=24).

The bitmap parameter typeI-SinglePanel-ri-Restriction (or twoTX-CodebookSubsetRestriction for 2 antenna ports) for the rank restriction is provided (configured).

In one alternative, regardless of whether BWP>=X PRBs or BWP<X PRBs, the bitmap parameter typeI-SinglePanel-ri-Restriction forms the bit sequence $r_7, \ldots, r_1, r_0$ where $r_0$ is the LSB and $r_7$ is the MSB. When $r_i$ is zero, $i \in \{0, 1, \ldots, 7\}$, PMI and RI reporting are not allowed to correspond to any precoder associated with $\upsilon = i+1$ layers.

In another alternative,
when BWP>=X PRBs, the bitmap parameter typeI-SinglePanel-ri-Restriction forms the bit sequence $r_7, \ldots, r_1, r_0$ where $r_0$ is the LSB and $r_7$ is the MSB. When $r_i$ is zero, $i \in \{0, 1, \ldots, 7\}$, PMI and RI reporting are not allowed to correspond to any precoder associated with $\upsilon = i+1$ layers.
when BWP<X PRBs, the bitmap parameter typeI-SinglePanel-ri-Restriction forms the bit sequence $r_3, r_2, r_1, r_0$ where $r_0$ is the LSB and $r_3$ is the MSB. When $r_i$ is zero, $i \in \{0,1,2,3\}$, PMI and RI reporting are not allowed to correspond to any precoder associated with $\upsilon = i+1$ layers.

In one example 1A.4, the WB CSI reporting for BWP<X PRBs (e.g., X=24) is restricted to codebookMode=1. The parameter codebookMode is configured with the higher-layer signaling.

In one example 1A.5, the WB CSI reporting for BWP<X PRBs (e.g., X=24) is restricted to rank 1 only and codebookMode=1 (i.e., a combination of example 1A.1 and 1A.4).

In one example 1A.6, the WB CSI reporting for BWP<X PRBs (e.g., X=24) is restricted to rank 1 or 2 only and codebookMode=1 (i.e., a combination of example 1A.2 and 1A.4).

In one example 1A.7, the WB CSI reporting for BWP<X PRBs (e.g., X=24) is restricted to rank 1, 2, 3, or 4 only and codebookMode=1 (i.e., a combination of example 1A.3 and 1A.4).

In one example 1A.8, the WB CSI reporting for BWP<X PRBs (e.g., X=24) is restricted to $N_{CSIRS} \leq p$, where $N_{CSIRS}$ is a number of CSI-RS antenna ports and p is fixed, for example to 2 or 4 or 8. Alternatively, the WB CSI reporting for BWP<X PRBs (e.g., X=24) is restricted to $N_{CSIRS} \in S$, where $N_{CSIRS}$ is a number of CSI-RS antenna ports and S is a fixed set, for example to $\{2\}$ or $\{2,4\}$ or $\{2,4,8\}$.

In one example 1A.9, in addition to the restriction in example 1A.1 through example 1A.7, the $N_{CSIRS}$ value is also restricted (i.e., a combination of one of example 1A.1 through 1A.7 and example 1A.8).

In embodiment 1B, a UE can be configured with a CSI reporting based on the Rel. 15 Type I multiple panel codebook for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$).

At least one of the following examples is used.

In one example 1B.1, the WB CSI reporting for BWP<X PRBs (e.g., X=24) is supported for (or restricted to) rank 1 only.

The UE shall not report the RI value $\upsilon$ if BWP<X PRBs (e.g., X=24). Alternatively, the UE shall report $\upsilon = 1$ (or shall not report $\upsilon > 1$) if BWP<X PRBs (e.g., X=24).

The bitmap parameter ri-Restriction for the rank restriction is absent or not provided (not configured). Alternatively, the UE doesn't expect to be configured with the bitmap parameter ri-Restriction if BWP<X PRBs (e.g., X=24). Alternatively, the bitmap parameter ri-Restriction for the rank restriction is provided (configured), but the UE doesn't use (hence ignores) it.

In example 1B.2, the WB CSI reporting for BWP<X PRBs (e.g., X=24) is restricted to (or supported for) rank 1 or 2 only.

The UE shall report the RI value $\upsilon$ according to the configured higher layer parameter ri-Restriction. The UE shall not report $\upsilon > 2$ if BWP<X PRBs (e.g., X=24).

The bitmap parameter ri-Restriction for the rank restriction is provided (configured).

In one alternative, regardless of whether BWP>=X PRBs or BWP<X PRBs, the bitmap parameter ri-Restriction forms the bit sequence $r_3, \ldots, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with $\upsilon = i+1$ layers.

In another alternative,
when BWP>=X PRBs, the bitmap parameter ri-Restriction forms the bit sequence $r_3, \ldots, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with $\upsilon = i+1$ layers.
when BWP<X PRBs, the bitmap parameter ri-Restriction forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with $\upsilon = i+1$ layers.

In one example 1B.3, the WB CSI reporting for BWP<X PRBs (e.g., X=24) is restricted to codebookMode=1. The parameter codebookMode is configured with the higher-layer signaling.

In one example 1B.4, the WB CSI reporting for BWP<X PRBs (e.g., X=24) is restricted to rank 1 only and codebookMode=1 (i.e., a combination of example 1B.1 and 1B.3).

In one example 1B.5, the WB CSI reporting for BWP<X PRBs (e.g., X=24) is restricted to rank 1 or 2 only and codebookMode=1 (i.e., a combination of example 1B.2 and 1B.3).

In one example 1B.6, the WB CSI reporting for BWP<X PRBs (e.g., X=24) is restricted to $N_{CSIRS} \leq p$, where $N_{CSIRS}$ is a number of CSI-RS antenna ports and p is fixed, for example to 8. Alternatively, the WB CSI reporting for BWP<X PRBs (e.g., X=24) is restricted to $N_{CSIRS} \in S$, where $N_{CSIRS}$ is a number of CSI-RS antenna ports and S is a fixed set, for example to $\{8\}$.

In one example 1B.7, in addition to the restriction in example 1B.1 through example 1B.5, the $N_{CSIRS}$ value is also restricted (i.e., a combination of one of example 1B.1 through 1B.5 and example 1B.6).

In embodiment 1C, a UE can be configured with a CSI reporting based on the Rel. 15 Type II (or Type II port selection) codebook for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$).

At least one of the following examples is used.

In one example 1C.1, the WB CSI reporting for BWP<X PRBs (e.g., X=24) is supported for (or restricted to) rank 1 only.

The UE shall not report the RI value υ if BWP<X PRBs (e.g., X=24). Alternatively, the UE shall report the RI value υ according to the configured higher layer parameter typeII-RI-Restriction (or typeII-PortSelectionRI-Restriction). The UE shall not report υ>z where z=2 if BWP>=X PRBs and z=1 if BWP<X PRBs (e.g., X=24).

The bitmap parameter typeII-RI-Restriction (or typeII-PortSelectionRI-Restriction) for the rank restriction is absent or not provided (not configured). Alternatively, the UE doesn't expect to be configured with the bitmap parameter typeII-RI-Restriction-r16 (or typeII-PortSelectionRI-Restriction) if BWP<X PRBs (e.g., X=24). Alternatively, the bitmap parameter typeII-RI-Restriction-r16 (or typeII-PortSelectionRI-Restriction) for the rank restriction is provided (configured), but the UE doesn't use (hence ignores) it.

In one example 1C.2, the WB CSI reporting for BWP<X PRBs (e.g., X=24) is restricted to L=2 (i.e., numberOfBeams=2).

In one example 1C.3, the WB CSI reporting for BWP<X PRBs (e.g., X=24) is restricted to rank 1 only and L=2 (i.e., a combination of example 1C.1 and 1C.2).

In one example 1C.4, the WB CSI reporting for BWP<X PRBs (e.g., X=24) is restricted to QPSK phase or $N_{PSK}=4$ (i.e., phaseAlphabetSize=4).

In one example 1C.5, the WB CSI reporting for BWP<X PRBs (e.g., X=24) is restricted to rank 1 only and QPSK phase (i.e., a combination of example 1C.1 and 1C.4).

In one example 1C.6, the WB CSI reporting for BWP<X PRBs (e.g., X=24) is restricted to L=2 and QPSK phase (i.e., a combination of example 1C.2 and 1C.4).

In one example 1C.7, the WB CSI reporting for BWP<X PRBs (e.g., X=24) is restricted to rank 1 only, L=2 and QPSK phase (i.e., a combination of example 1C.1, 1C.2 and 1C.4).

In one example 1C.8, the WB CSI reporting for BWP<X PRBs (e.g., X=24) is restricted to subbandAmplitude set to 'false'.

In one example 1C.9, in addition to the restriction in example 1C.1 through example 1C.7, the WB CSI reporting for BWP<X PRBs (e.g., X=24) is also restricted to subbandAmplitude set to 'false' (i.e., a combination of one of example 1C.1 through 1C.7 and example 1C.8).

In one example 1C.10, the WB CSI reporting for BWP<X PRBs (e.g., X=24) is restricted to $N_{CSIRS} \leq p$, where $N_{CSIRS}$ is a number of CSI-RS antenna ports and p is fixed, for example to 4 or 8. Alternatively, the WB CSI reporting for BWP<X PRBs (e.g., X=24) is restricted to $N_{CSIRS} \in S$, where $N_{CSIRS}$ is a number of CSI-RS antenna ports and S is a fixed set, for example to {4} or {4,8}.

In one example 1C.11, in addition to the restriction in example 1C.1 through example 1C.9, the $N_{CSIRS}$ value is also restricted (i.e., a combination of one of example 1C.1 through 1C.9 and example 1C.10).

In embodiment 1D, a UE can be configured with a CSI reporting based only on either codebook A or codebook B for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$). The codebook A and B are determined based on at least one of the examples in Table 3, wherein codebooks A or/and B can be without any restriction or with a restriction according to an example in respective embodiments.

TABLE 3

| Example | Codebook A | | Codebook B | |
|---|---|---|---|---|
| Example 1D.1 | Rel. 16 enhanced Type II (or enhanced Type II port selection) codebook | Embodiment 1 (without or with a restriction) | Rel. 15 Type I single panel codebook | Embodiment 1A (without or with a restriction) |
| Example 1D.2 | Rel. 16 enhanced Type II (or enhanced Type II port selection) codebook | Embodiment 1 (without or with a restriction) | Rel. 15 Type I multi panel codebook | Embodiment 1B (without or with a restriction) |
| Example 1D.3 | Rel. 16 enhanced Type II (or enhanced Type II port selection) codebook | Embodiment 1 (without or with a restriction) | Rel. 15 Type II (or Type II port selection) codebook | Embodiment 1C (without or with a restriction) |
| Example 1D.4 | Rel. 15 Type II (or Type II port selection) codebook | Embodiment 1C (without or with a restriction) | Rel. 15 Type I single panel codebook | Embodiment 1A (without or with a restriction) |
| Example 1D.5 | Rel. 15 Type II (or Type II port selection) codebook | Embodiment 1C (without or with a restriction) | Rel. 15 Type I multi panel codebook | Embodiment 1B (without or with a restriction) |
| Example 1D.6 | Rel. 15 Type I multi panel codebook | Embodiment 1B (without or with a restriction) | Rel. 15 Type I single panel codebook | Embodiment 1A (without or with a restriction) |

In embodiment 1E, a UE can be configured with a CSI reporting based only on either codebook A or codebook B or codebook C for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$). The codebooks A, B, and C are determined based on at least one of the examples in Table 4, wherein codebooks A or/and B or/and C can be without any restriction or with a restriction according to an example in respective embodiments.

TABLE 4

| Example | Codebook A | | Codebook B | | Codebook C | |
|---|---|---|---|---|---|---|
| Example 1E.1 | Rel. 16 enhanced Type II (or enhanced Type II port selection) codebook | Embodiment 1 (without or with a restriction) | Rel. 15 Type I single panel codebook | Embodiment 1A (without or with a restriction) | Rel. 15 Type I multi panel codebook | Embodiment 1B (without or with a restriction) |
| Example 1E.2 | Rel. 16 enhanced Type II (or enhanced Type II port selection) codebook | Embodiment 1 (without or with a restriction) | Rel. 15 Type I single panel codebook | Embodiment 1A (without or with a restriction) | Rel. 15 Type II (or Type II port selection) codebook | Embodiment 1C (without or with a restriction) |
| Example 1E.3 | Rel. 16 enhanced Type II (or enhanced Type II port selection) codebook | Embodiment 1 (without or with a restriction) | Rel. 15 Type I multi panel codebook | Embodiment 1B (without or with a restriction) | Rel. 15 Type II (or Type II port selection) codebook | Embodiment 1C (without or with a restriction) |
| Example 1E.4 | Rel. 15 Type I single panel codebook | Embodiment 1A (without or with a restriction) | Rel. 15 Type I multi panel codebook | Embodiment 1B (without or with a restriction) | Rel. 15 Type II (or Type II port selection) codebook | Embodiment 1C (without or with a restriction) |

In embodiment 1F, a UE can be configured with a CSI reporting based only on either codebook A or codebook B or codebook C or codebook D for BWP<X PRBs (e.g., X=24), wherein the CSI reporting corresponds to a wideband (WB) CSI reporting, i.e., both PMI and CQI correspond to WB reporting. In particular, for BWP<X PRBs (e.g., X=24), the CSI reporting band is the entire BWP (or equivalently SB size is the entire BWP or CSI reporting band), a (single) WB CQI is reported (for each codeword) for the entire CSI reporting band, and a (single) WB PMI is reported for the entire CSI reporting band which indicates that the total number of precoding matrix (matrices) $N_3$ indicated by the PMI is equal to one (i.e., $N_3=1$). In one example, the codebooks A is Rel. 16 enhanced Type II (or enhanced Type II port selection) codebook, the codebook B is Rel. 15 Type I single panel codebook, the codebook C is Rel. 15 Type I multi panel codebook, and the codebook D is Rel. 15 Type II (or Type II port selection) codebook, wherein codebooks A or/and B or/and C or/and D can be without any restriction or with a restriction according to an example in respective embodiments.

In one example, the WB CSI reporting for BWP<X PRBs (e.g., X=24) is configured to be via PUSCH. The WB CSI can be multiplexed with a one-part UCI. Or, the WB CSI can be multiplexed with a two-part UCI, similar to SB CSI reporting on PUSCH in Rel. 15 NR. When one-part UCI is used, the WB CSI payload can change depending on the reported rank value. In order to fix the CSI payload, a fixed number of zero padding bits can be inserted into the CSI bits so that the payload after inserting zero padding bits does not change with the reported rank value. This is akin to the WB CSI reporting on PUCCH in Rel. 15 NR.

In another example, the WB CSI reporting for BWP<X PRBs (e.g., X=24) is configured to be via PUCCH. The WB CSI payload can be change depending on the reported rank value. In order to fix the CSI payload, a fixed number of zero padding bits can be inserted into the CSI bits so that the payload after inserting zero padding bits does not change with the reported rank value. This is akin to the WB CSI reporting on PUCCH in Rel. 15 NR.

Component 2—SB CSI Reporting

In embodiment 2, a UE can be configured with a CSI reporting based on the Rel. 16 enhanced Type II (or enhanced Type II port selection) codebook for BWP<X PRBs (e.g., X=24), wherein the CSI reporting corresponds to a subband (SB) CSI reporting, i.e., at least one of PMI and CQI corresponds to SB reporting.

At least one of the following examples is used.

In one example 2.1, the SB CSI reporting for BWP<X PRBs (e.g., X=24) is based on the SB size as shown in Table 5. Three alternatives (Alt) for the SB size are shown. A UE can be configured via higher layer signaling with one out of two possible subband sizes (Alt2.2 and 2.3).

TABLE 5

| Configurable subband sizes | |
|---|---|
| Bandwidth part (PRBs) | Subband size (PRBs) |
| <24 | Alt2.1: 4<br>Alt2.2: 4, 8<br>Alt2.3: 2, 4 |

In one example 2.2, the SB CSI reporting for BWP<X PRBs (e.g., X=24) is further restricted, where the restriction is based on one of or a combination of the following parameters: rank ($v$), L, R, $\beta$, and $N_{CSIRS}$. At least one of example 1.1 through 1.26 is used for the restriction.

In embodiment 2A, a UE can be configured with a CSI reporting based on Rel. 15 Type I single panel codebook for BWP<X PRBs (e.g., X=24), wherein the CSI reporting corresponds to a subband (SB) CSI reporting, i.e., at least one of PMI and CQI corresponds to SB reporting.

At least one of the following examples is used.

In one example 2A.1, the SB CSI reporting for BWP<X PRBs (e.g., X=24) is based on the SB size as shown in Table 5. Three alternatives (Alt) for the SB size are shown. A UE can be configured via higher layer signaling with one out of two possible subband sizes (Alt2.2 and 2.3).

In one example 2A.2, the SB CSI reporting for BWP<X PRBs (e.g., X=24) is further restricted, where the restriction is based on one of or a combination of the following parameters: rank ($v$), codebookMode, and $N_{CSIRS}$. At least one of example 1A.1 through 1A.9 is used for the restriction.

In embodiment 2B, a UE can be configured with a CSI reporting based on Rel. 15 Type I multi panel codebook for BWP<X PRBs (e.g., X=24), wherein the CSI reporting corresponds to a subband (SB) CSI reporting, i.e., at least one of PMI and CQI corresponds to SB reporting.

At least one of the following examples is used.

In one example 2B.1, the SB CSI reporting for BWP<X PRBs (e.g., X=24) is based on the SB size as shown in Table 5. Three alternatives (Alt) for the SB size are shown. A UE can be configured via higher layer signaling with one out of two possible subband sizes (Alt2.2 and 2.3).

In one example 2B.2, the SB CSI reporting for BWP<X PRBs (e.g., X=24) is further restricted, where the restriction is based on one of or a combination of the following parameters: rank ($v$), codebookMode, and $N_{CSIRS}$. At least one of example 1B.1 through 1B.9 is used for the restriction.

In embodiment 2C, a UE can be configured with a CSI reporting based on the Rel. 15 Type II (or Type II port selection) codebook for BWP<X PRBs (e.g., X=24), wherein the CSI reporting corresponds to a subband (SB) CSI reporting, i.e., at least one of PMI and CQI corresponds to SB reporting.

At least one of the following examples is used.

In one example 2C.1, the SB CSI reporting for BWP<X PRBs (e.g., X=24) is based on the SB size as shown in Table 5. Three alternatives (Alt) for the SB size are shown. A UE can be configured via higher layer signaling with one out of two possible subband sizes (Alt2.2 and 2.3).

In one example 2C.2, the SB CSI reporting for BWP<X PRBs (e.g., X=24) is further restricted, where the restriction is based on one of or a combination of the following parameters: rank ($v$), L, $N_{PSK}$, subbandAmplitude, and $N_{CSIRS}$. At least one of example 1C.1 through 1C.11 is used for the restriction.

In one embodiment 2D, a UE can be configured with a CSI reporting based only on either codebook A or codebook B for BWP<X PRBs (e.g., X=24), wherein the CSI reporting corresponds to a subband (SB) CSI reporting, i.e., at least one of PMI and CQI corresponds to SB reporting. The codebook A and B are determined based on at least one of the examples in Table 6, wherein codebooks A or/and B can be without any restriction or with a restriction according to an example in respective embodiments.

TABLE 6

| Example | Codebook A | | Codebook B | |
| --- | --- | --- | --- | --- |
| Example 2D.1 | Rel. 16 enhanced Type II (or enhanced Type II port selection) codebook | Embodiment 2 (without or with a restriction) | Rel. 15 Type I single panel codebook | Embodiment 2A (without or with a restriction) |
| Example 2D.2 | Rel. 16 enhanced Type II (or enhanced Type II port selection) codebook | Embodiment 2 (without or with a restriction) | Rel. 15 Type I multi panel codebook | Embodiment 2B (without or with a restriction) |
| Example 2D.3 | Rel. 16 enhanced Type II (or enhanced Type II port selection) codebook | Embodiment 2 (without or with a restriction) | Rel. 15 Type II (or Type II port selection) codebook | Embodiment 2C (without or with a restriction) |
| Example 2D.4 | Rel. 15 Type II (or Type II port selection) codebook | Embodiment 2C (without or with a restriction) | Rel. 15 Type I single panel codebook | Embodiment 2A (without or with a restriction) |
| Example 2D.5 | Rel. 15 Type II (or Type II port selection) codebook | Embodiment 2C (without or with a restriction) | Rel. 15 Type I multi panel codebook | Embodiment 2B (without or with a restriction) |
| Example 2D.6 | Rel. 15 Type I multi panel codebook | Embodiment 2B (without or with a restriction) | Rel. 15 Type I single panel codebook | Embodiment 2A (without or with a restriction) |

In embodiment 2E, a UE can be configured with a CSI reporting based only on either codebook A or codebook B or codebook C for BWP<X PRBs (e.g., X=24), wherein the CSI reporting corresponds to a subband (SB) CSI reporting, i.e., at least one of PMI and CQI corresponds to SB reporting. The codebooks A, B, and C are determined based on at least one of the examples in Table 7, wherein codebooks A or/and B or/and C can be without any restriction or with a restriction according to an example in respective embodiments.

TABLE 7

| Example | Codebook A | | Codebook B | | Codebook C | |
| --- | --- | --- | --- | --- | --- | --- |
| Example 2E.1 | Rel. 16 enhanced Type II (or enhanced Type II port selection) codebook | Embodiment 2 (without or with a restriction) | Rel. 15 Type I single panel codebook | Embodiment 2A (without or with a restriction) | Rel. 15 Type I multi panel codebook | Embodiment 2B (without or with a restriction) |

TABLE 7-continued

| Example | Codebook A | | Codebook B | | Codebook C | |
|---|---|---|---|---|---|---|
| Example 2E.2 | Rel. 16 enhanced Type II (or enhanced Type II port selection) codebook | Embodiment 2 (without or with a restriction) | Rel. 15 Type I single panel codebook | Embodiment 2A (without or with a restriction) | Rel. 15 Type II (or Type II port selection) codebook | Embodiment 2C (without or with a restriction) |
| Example 2E.3 | Rel. 16 enhanced Type II (or enhanced Type II port selection) codebook | Embodiment 2 (without or with a restriction) | Rel. 15 Type I multi panel codebook | Embodiment 2B (without or with a restriction) | Rel. 15 Type II (or Type II port selection) codebook | Embodiment 2C (without or with a restriction) |
| Example 2E.4 | Rel. 15 Type I single panel codebook | Embodiment 2A (without or with a restriction) | Rel. 15 Type I multi panel codebook | Embodiment 2B (without or with a restriction) | Rel. 15 Type II (or Type II port selection) codebook | Embodiment 2C (without or with a restriction) |

In embodiment 2F, a UE can be configured with a CSI reporting based only on either codebook A or codebook B or codebook C or codebook D for BWP<X PRBs (e.g., X=24), wherein the CSI reporting corresponds to a subband (SB) CSI reporting, i.e., at least one of PMI and CQI corresponds to SB reporting. In one example, the codebooks A is Rel. 16 enhanced Type II (or enhanced Type II port selection) codebook, the codebook B is Rel. 15 Type I single panel codebook, the codebook C is Rel. 15 Type I multi panel codebook, and the codebook D is Rel. 15 Type II (or Type II port selection) codebook, wherein codebooks A or/and B or/and C or/and D can be without any restriction or with a restriction according to an example in respective embodiments.

Component 3—UE Capability

In embodiment 3, a UE can be configured with a CSI reporting based on Rel. 16 enhanced Type II (or Rel. 16 enhanced Type II port selection or Rel. 15 Type I or Rel. 15 Type II or Rel. 15 Type II port selection) for BWP<X PRBs (e.g., X=24) subject to UE capability, wherein the CSI reporting corresponds to a WB or a SB CSI reporting.

In one example 3.1, the information whether the UE is capable to support WB CSI reporting for BWP<X PRBs (e.g., X=24) is provided by the UE via its capability signaling. This capability signaling is therefore optional. Hence, a UE may support Rel. 16 enhanced Type II only for BWP>=X PRBs, but not for BWP<X PRBs. Alternatively, another UE may support Rel. 16 enhanced Type II for both BWP>=X PRBs and BWP<X PRBs.

In one example 3.2, the information whether the UE is capable to support SB CSI reporting for BWP<X PRBs (e.g., X=24) is provided by the UE via its capability signaling. This capability signaling is therefore optional. Hence, a UE may support Rel. 16 enhanced Type II only for BWP>=X PRBs, but not for BWP<X PRBs. Alternatively, another UE may support Rel. 16 enhanced Type II for both BWP>=X PRBs and BWP<X PRBs.

In one example 3.3, the WB CSI reporting for BWP<X PRBs (e.g., X=24) is supported by all UEs supporting Rel. 16 enhanced Type II CSI reporting. The information whether the UE is also capable to support SB CSI reporting is provided by the UE via its capability signaling. This additional capability signaling (for SB CSI reporting) is therefore optional.

In one example 3.4, the information whether the UE is capable to support WB or SB CSI reporting for BWP<X PRBs (e.g., X=24) is provided by the UE via its capability signaling. This capability signaling is therefore optional. Hence, a UE may support Rel. 16 enhanced Type II only for BWP>=X PRBs, but not for BWP<X PRBs. Alternatively, another UE may support Rel. 16 enhanced Type II for both BWP>=X PRBs and BWP<X PRBs.

In one example 3.5, the UE capability according to one of example 3.1 through 3.4 is also applicable to Rel. 16 enhanced Type II port selection codebook.

In one example 3.6, the UE capability according to one of example 3.1 through 3.4 is also applicable to Rel. 15 Type I codebook.

In one example 3.7, the UE capability according to one of example 3.1 through 3.4 is also applicable to Rel. 15 Type II codebook.

In one example 3.8, the UE capability according to one of example 3.1 through 3.4 is also applicable to Rel. 15 Type II port selection codebook.

Component 4—CSI Reporting Based on Rel. 16 Enhanced Type II for Small Number of SBs In embodiment 4, a UE can be configured with a CSI reporting based on the Rel. 16 enhanced Type II (or enhanced Type II port selection) codebook [Section 5.2.2.2.5 and 5.2.2.2.6 of REF8], wherein the CSI reporting corresponds to a subband (SB) CSI reporting, i.e., at least one of PMI and CQI corresponds to SB reporting. Let $N_{SB}$ be the number of subbands in csi-ReportingBand configured to the UE for the CSI reporting. The codebook-parameters are configured as follows.

The values of L, β and $p_υ$ are determined by the higher layer parameter paramCombination-r16, where the mapping is given in Table 1.

The UE is not expected to be configured with param-Combination-r16 equal to
3, 4, 5, 6, 7, or 8 when $P_{CSI-RS}=4$,
7 or 8 when $P_{CSI-RS}<32$ 7 or 8 when higher layer parameter typeII-RI-Restriction-r16 is configured with $r_i=1$ for any $i>1$.

7 or 8 when R=2.

The parameter R is configured with the higher-layer parameter numberOfPMISubbandsPerCQISubband. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part according to Table 2, as follows:

When R=1:
  One precoding matrix is indicated by the PMI for each subband in csi-ReportingBand.

When R=2:
  For each subband in csi-ReportingBand that is not the first or last subband of a BWP, two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

For each subband in csi-ReportingBand that is the first or last subband of a BWP If $$\left(N_{BWP,i}^{start} \bmod N_{PRB}^{SB}\right) \geq \frac{N_{PRB}^{SB}}{2},$$

one precoding matrix is indicated by the PMI corresponding to the first subband. If $$\left(N_{BWP,i}^{start} \bmod N_{PRB}^{SB}\right) < \frac{N_{PRB}^{SB}}{2},$$

two precoding matrices are indicated by the PMI corresponding to the first subband: the first precoding matrix corresponds to the first $$\frac{N_{PRB}^{SB}}{2} - \left(N_{BWP,i}^{start} \bmod N_{PRB}^{SB}\right)$$

PRBs of the first subband and the second precoding matrix corresponds to the last $$\frac{N_{PRB}^{SB}}{2}$$

PRBs of the first subband.

If $$\left(N_{BWP,i}^{start} + N_{BWP,i}^{size}\right) \bmod N_{PRB}^{SB} \leq \frac{N_{PRB}^{SB}}{2},$$

one precoding matrix is indicated by the PMI corresponding to the last subband. If $$\left(N_{BWP,i}^{start} + N_{BWP,i}^{size}\right) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$\left(N_{BWP,i}^{start} + N_{BWP,i}^{size}\right) \bmod N_{PRB}^{SB} - \frac{N_{PRB}^{SB}}{2}$$

PRBs of the last subband.

The number of frequency domain (FD) basis vectors is given by $$M_v = \left\lceil p_v \frac{N_3}{R} \right\rceil.$$

And the upper bound on the number of non-zero (NZ) coefficients that the UE can report for each layer is given by $K_0 = \lceil 2LM_1 \rceil$ such that $K_l^{NZ} \leq K_0$ is the number of nonzero coefficients for layer $l=1, \ldots, \upsilon$ and $K^{NZ} = \Sigma_{l=1}^{\upsilon} K_l^{NZ} \leq 2K_0$ is the total number of nonzero coefficients. The $K_0$ values for $M_1=1, 2, 3$ and different paramCombination-r16 values is shown in Table 8.

TABLE 8

|  |  | $p_v$ |  |  | $K_0$ | | |
| --- | --- | --- | --- | --- | --- | --- | --- |
| paramCombination-r16 | L | $v \in \{1, 2\}$ | $v \in (3, 4)$ | β | $M_1 = 1$ | $M_1 = 2$ | $M_1 = 3$ |
| 1 | 2 | ¼ | ⅛ | ¼ | 1 | 2 | 3 |
| 2 | 2 | ¼ | ⅛ | ½ | 2 | 4 | 6 |
| 3 | 4 | ¼ | ⅛ | ¼ | 2 | 4 | 6 |
| 4 | 4 | ¼ | ⅛ | ½ | 4 | 8 | 12 |
| 5 | 4 | ¼ | ¼ | ¾ | 6 | 12 | 18 |
| 6 | 4 | ½ | ¼ | ½ | 4 | 8 | 12 |
| 7 | 6 | ¼ | — | ½ | 6 | 12 | 18 |
| 8 | 6 | ¼ | — | ¾ | 9 | 18 | 27 |

As shown in bold in Table 8, when $M_1=1$, 2 and paramCombination-r16=1, 2, 3, then $K_0$ can be so small (e.g., 1 or 2) that there is not sufficient number of NZ coefficients to report CSI. Now, since $N_{SB} \geq 3$, based on Table 2, $M_1=1$ when $N_{SB}=3$, 4 and $M_1=2$ when $N_{SB}=5, 6, 7, 8$. So, the above issue with $K_0$ value is for the following parameter combinations and $N_{SB}$ values.

A: When $N_{SB}=3$, 4 and paramCombination-r16=1, the above issue is for all rank values (e.g., rank 1, 2, 3, 4)

B: When $N_{SB}=3,4$ and paramCombination-r16=2,3, the above issue is for rank=3-4. However, there is no such issue with rank 1-2, hence, the UE can still report rank 1-2 CSI without any issue (assuming rank 1-2 is not restricted via rank restriction).

C: When $N_{SB}=5-8$ and paramCombination-r16=1, the above issue is for rank 4. However, there is no issue with rank 1-3, hence, the UE can report rank 1-3 CSI without any issue (assuming rank 1-3 is not restricted via rank restriction).

One way to avoid this issue then is to restrict (not allowed) such parameter combinations and $N_{SB}$ values. At least one of the following examples is used.

In one example 4.1, the UE is not expected to be configured with paramCombination-r16=1 when $N_{SB}=3, 4$.

In one example 4.2, the UE is not expected to be configured with paramCombination-r16=1, 2 when $N_{SB}=3, 4$.

In one example 4.3, the UE is not expected to be configured with paramCombination-r16=1, 2, 3 when $N_{SB}=3, 4$.

In one example 4.4, the UE is not expected to be configured with paramCombination-r16=X when $N_{SB}=Y$, where X and Y are set of values that are restricted (not allowed). In one example, X is fixed to 1, 1-2, or 1-3. In one example Y is fixed to 3 or 3-4.

In one example 4.5, the UE is not expected to be configured with paramCombination-r16=1 when $N_{SB}=3, 4$ and allowed rank (e.g., via rank restriction) is 1, 2, 3, 4.

In one example 4.6, the UE is not expected to be configured with paramCombination-r16=2 when $N_{SB}=3, 4$ and allowed rank (e.g., via rank restriction) is 3, 4.

In one example 4.7, the UE is not expected to be configured with paramCombination-r16=3 when $N_{SB}=3, 4$ and allowed rank (e.g., via rank restriction) is 3, 4.

In one example 4.8, the UE is not expected to be configured with paramCombination-r16=1 when $N_{SB}=5-8$ and allowed rank (e.g., via rank restriction) is 3, 4.

In one example 4.9, a combination of two restrictions according to example 4.A and example 4.B, where (A,B) is such that A belongs to $\{1,2,3,4\}$ and B belongs to $\{5,6,7,8\}$.

In one example 4.10, a combination of two restrictions according to example 4.A and example 4.B, where (A,B) is such that A belongs to $\{1,2,3,4, \ldots, 8\}$ and B belongs to $\{1,2,3,4,5,6,7,8\}$, and $A \neq B$.

Component 5—Extension to Distributed Antenna Architecture

Figure 13:
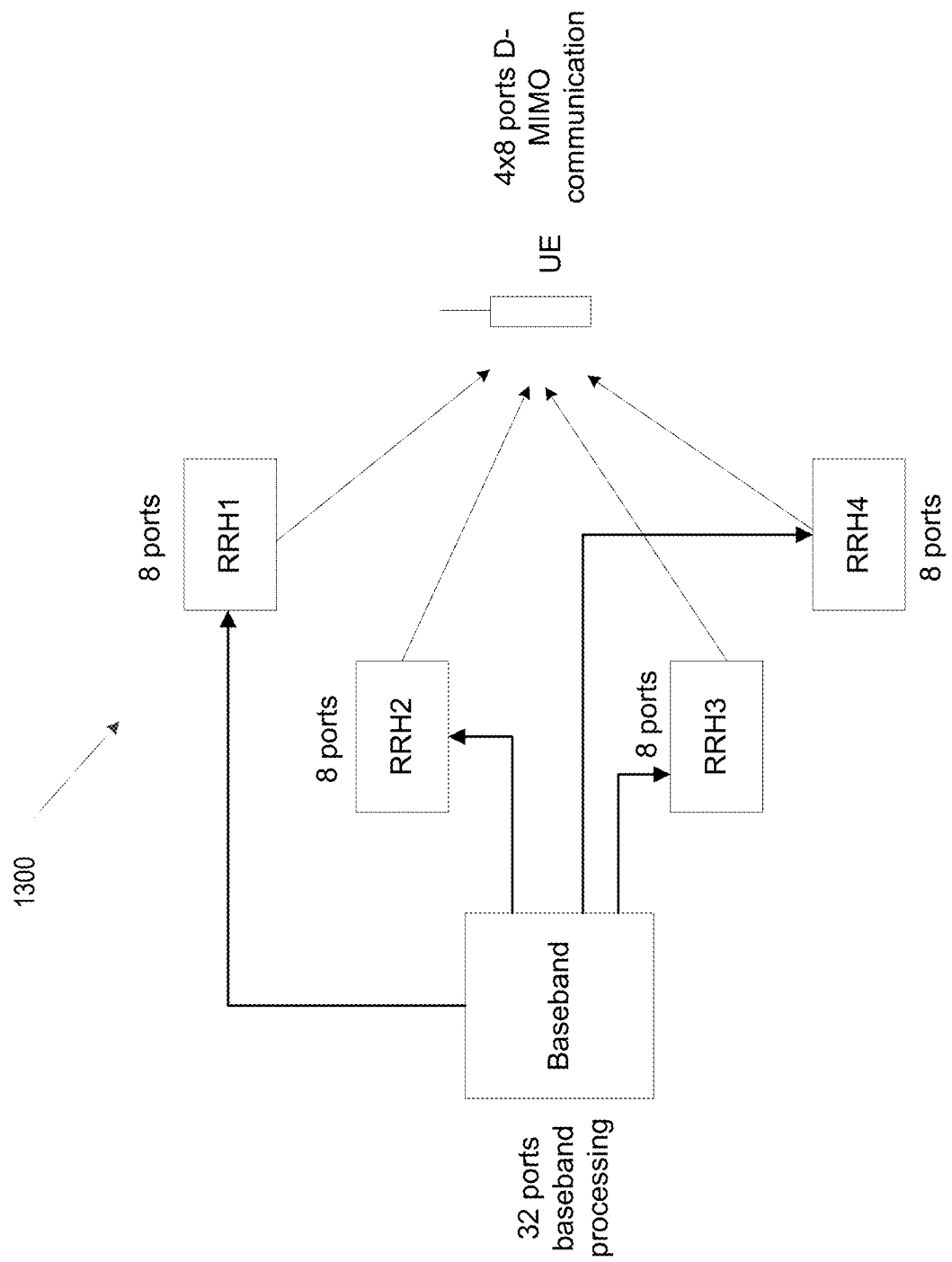
FIG. 13 illustrates an example of a distributed MIMO (D-MIMO) system according to embodiments of the present disclosure.

FIG. 13 illustrates an example of a distributed MIMO (D-MIMO) system 1300 according to embodiments of the present disclosure. The embodiment of the D-MIMO system 1300 illustrated in FIG. 13 is for illustration only. FIG. 13 does not limit the scope of this disclosure to any particular implementation of the D-MIMO system 1300.

As illustrated in FIG. 13, for a cellular system operating in a sub-1 GHz frequency range (e.g., less than 1 GHz), supporting a large number of CSI-RS antenna ports (e.g., 32) at one site or remote radio head (RRH) is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with a large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) system.

In embodiment 5, for a distributed MIMO antenna architecture, a UE is configured with a CSI reporting based on a D-MIMO codebook comprising hybrid pre-coders (for each layer), wherein the (hybrid) pre-coder is given by $$W = R \times Q = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix} \times \begin{bmatrix} q_1 \\ q_2 \\ \vdots \\ q_{N_{RRH}} \end{bmatrix} = \begin{bmatrix} q_1 \times P_1 \\ q_2 \times P_2 \\ \vdots \\ q_{N_{RRH}} \times P_{N_{RRH}} \end{bmatrix},$$

$$\text{where } R = \begin{bmatrix} P_1 & 0 & 0 & 0 \\ 0 & P_2 & 0 & 0 \\ 0 & 0 & \ddots & 0 \\ 0 & 0 & 0 & P_{N_{RRH}} \end{bmatrix}$$

is a block diagonal matrix comprising $N_{RRH}$ blocks, the r-th block $P_r$ is a (intra-RRH) pre-coding vector for the r-th RRH, and $$Q = \begin{bmatrix} q_1 \\ q_2 \\ \vdots \\ q_{N_{RRH}} \end{bmatrix}$$

is an inter-RRH pre-coding vector across $N_{RRH}$ RRHs.

The UE is further configured with a CSI reporting band and a frequency granularity of CSI reporting, where the CSI reporting band is within a bandwidth part (BWP) comprising M physical resource blocks (PRBs), and the frequency granularity of CSI reporting is based on whether M<N, where N is a threshold. In one example, N=24. In one example, the frequency granularity of CSI reporting is one of wideband and subband, whose details are according to some embodiments or examples (or their straightforward extensions to D-MIMO setup) of this disclosure. For example, when M<N, then the frequency granularity can be fixed to wideband only, and when M>=N, the frequency granularity can be wideband or subband (configurable).

Likewise, in one example, when M<N, the D-MIMO codebook (configured) for CSI reporting can be fixed to Type I (cf. Rel. 15 Type I codebook), and when M>=N, the D-MIMO codebook can be (configured to be) any of the supported D-MIMO codebook(s). The embodiments and examples of this disclosure that are about codebook(s) can be extended to include D-MIMO codebook(s) in a straightforward manner by those skilled in the art.

In embodiment C, a UE can be configured with a CSI reporting based on the Rel. 16 enhanced Type II (or enhanced Type II port selection) codebook [Section 5.2.2.2.5 and 5.2.2.2.6 of REF8], wherein the CSI reporting corresponds to a subband (SB) CSI reporting, i.e., at least one of PMI and CQI corresponds to SB reporting. The codebook-parameters are configured as follows.

The values of L, β and $p_υ$ are determined by the higher layer parameter paramCombination-r16, where the mapping is given in Table 9.

The UE is not expected to be configured with param-Combination-r16 equal to
- 3, 4, 5, 6, 7, or 8 when $P_{CSI-RS}=4$,
- 7 or 8 when $P_{CSI-RS}<32$
- 7 or 8 when higher layer parameter typeII-RI-Restriction-r16 is configured with $r_i=1$ for any i>1.
- 7 or 8 when R=2.

The parameter R is configured with the higher-layer parameter numberOfPMISubbandsPerCQISubband. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part according to Table 14, as follows:

When R=1:
  One precoding matrix is indicated by the PMI for each subband in csi-ReportingBand.

When R=2:
  For each subband in csi-ReportingBand that is not the first or last subband of a BWP, two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

For each subband in csi-ReportingBand that is the first or last subband of a BWP
    If $$1 + \left(N_{BWP,i}^{start} \bmod N_{PRB}^{SB}\right) \geq \frac{N_{PRB}^{SB}}{2},$$

one precoding matrix is indicated by the PMI corresponding to the first subband. If $$\left(N_{BWP,i}^{start} \bmod N_{PRB}^{SB}\right) < \frac{N_{PRB}^{SB}}{2},$$

two precoding matrices are indicated by the PMI corresponding to the first subband: the first precoding matrix corresponds to the first $$\frac{N_{PRB}^{SB}}{2} - \left(N_{BWP,i}^{start} \bmod N_{PRB}^{SB}\right)$$

PRBs of the first subband and the second precoding matrix corresponds to the last $$\frac{N_{PRB}^{SB}}{2}$$

PRBs of the first subband.

If $$1 + \left(N_{BWP,i}^{start} + N_{BWP,i}^{size} - 1\right) \bmod N_{PRB}^{SB} \leq \frac{N_{PRB}^{SB}}{2},$$

one precoding matrix is indicated by the PMI corresponding to the last subband. If $$1 + \left(N_{BWP,i}^{start} + N_{BWP,i}^{size} - 1\right) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$1 + \left(N_{BWP,i}^{start} + N_{BWP,i}^{size} - 1\right) \bmod N_{PRB}^{SB} - \frac{N_{PRB}^{SB}}{2}$$

PRBs of the last subband.

TABLE 9

Codebook parameter configurations for L, β and $p_υ$

| | | $p_υ$ | | |
| --- | --- | --- | --- | --- |
| paramCombination-r16 | L | $υ \in \{1, 2\}$ | $υ \in \{3, 4\}$ | β |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

The UE shall report the RI value υ according to the configured higher layer parameter typeII-RI-Restriction-r16. The UE shall not report υ>4.

The UCI for the bitwidth for PMI of codebookType=typeII-r16 is provided in Table 10, where the values of $(N_1, N_2)$, $(O_1, O_2)$, L, $K_{NZ,TOT}$, $N_3$, R, β, $y_0$ and $v_0$ are given by Subclause 5.2.2.2.5 in [REF8].

TABLE 10

| PMI of codebook Type = typeIIr16 | | | | | |
|---|---|---|---|---|---|
| Information fields $X_1$ for PMI (for group G0) | | | | | |
| $i_{1,1}$ | $i_{1,2}$ | $i_{1,8,1}$ | $i_{1,8,2}$ | $i_{1,8,3}$ | $i_{1,8,4}$ |

| | $i_{1,1}$ | $i_{1,2}$ | $i_{1,8,1}$ | $i_{1,8,2}$ | $i_{1,8,3}$ | $i_{1,8,4}$ |
|---|---|---|---|---|---|---|
| Rank = 1 | $\lceil \log_2(O_1 O_2) \rceil$ | $\left\lceil \log_2 \binom{N_1 N_2}{L} \right\rceil$ | $\lceil \log_2 K^{NZ} \rceil$ | N/A | N/A | N/A |
| Rank = 2 | $\lceil \log_2(O_1 O_2) \rceil$ | $\left\lceil \log_2 \binom{N_1 N_2}{L} \right\rceil$ | $\lceil \log_2(2L) \rceil$ | $\lceil \log_2(2L) \rceil$ | N/A | N/A |
| Rank = 3 | $\lceil \log_2(O_1 O_2) \rceil$ | $\left\lceil \log_2 \binom{N_1 N_2}{L} \right\rceil$ | $\lceil \log_2(2L) \rceil$ | $\lceil \log_2(2L) \rceil$ | $\lceil \log_2(2L) \rceil$ | N/A |
| Rank = 4 | $\lceil \log_2(O_1 O_2) \rceil$ | $\left\lceil \log_2 \binom{N_1 N_2}{L} \right\rceil$ | $\lceil \log_2(2L) \rceil$ | $\lceil \log_2(2L) \rceil$ | $\lceil \log_2(2L) \rceil$ | $\lceil \log_2(2L) \rceil$ |

| Information fields $X_2$ | | | | | |
|---|---|---|---|---|---|
| | $i_{2,3,1}$ | $i_{2,3,2}$ | $i_{2,3,3}$ | $i_{2,3,4}$ | $i_{1,5}$ | $i_{1,6,1}$ |

| | $i_{2,3,1}$ | $i_{2,3,2}$ | $i_{2,3,3}$ | $i_{2,3,4}$ | $i_{1,5}$ | $i_{1,6,1}$ |
|---|---|---|---|---|---|---|
| Rank = 1, $N_3 \leq 19$ | 4 | N/A | N/A | N/A | N/A | $\left\lceil \log_2 \binom{N_3 - 1}{M_1 - 1} \right\rceil$ |
| Rank = 2, $N_3 \leq 19$ | 4 | 4 | N/A | N/A | N/A | $\left\lceil \log_2 \binom{N_3 - 1}{M_2 - 1} \right\rceil$ |
| Rank = 3, $N_3 \leq 19$ | 4 | 4 | 4 | N/A | N/A | $\left\lceil \log_2 \binom{N_3 - 1}{M_3 - 1} \right\rceil$ |
| Rank = 4, $N_3 \leq 19$ | 4 | 4 | 4 | 4 | N/A | $\left\lceil \log_2 \binom{N_3 - 1}{M_4 - 1} \right\rceil$ |
| Rank = 1, $N_3 > 19$ | 4 | N/A | N/A | N/A | $\lceil \log_2(2M_1) \rceil$ | $\left\lceil \log_2 \binom{2M_1 - 1}{M_1 - 1} \right\rceil$ |
| Rank = 2, $N_3 > 19$ | 4 | 4 | N/A | N/A | $\lceil \log_2(2M_2) \rceil$ | $\left\lceil \log_2 \binom{2M_2 - 1}{M_2 - 1} \right\rceil$ |
| Rank = 3, $N_3 > 19$ | 4 | 4 | 4 | N/A | $\lceil \log_2(2M_3) \rceil$ | $\left\lceil \log_2 \binom{2M_3 - 1}{M_3 - 1} \right\rceil$ |
| Rank = 4, $N_3 > 19$ | 4 | 4 | 4 | 4 | $\lceil \log_2(2M_4) \rceil$ | $\left\lceil \log_2 \binom{2M_4 - 1}{M_4 - 1} \right\rceil$ |

| Information fields $X_2$ | | | | | |
|---|---|---|---|---|---|
| | $i_{1,6,2}$ | $i_{1,6,3}$ | $i_{1,6,4}$ | $\{i_{2,4,l}\}_{l=1,\ldots,v}$ | $\{i_{2,5,l}\}_{l=1,\ldots,v}$ | $\{i_{2,7,l}\}_{l=1,\ldots,v}$ |

| | $i_{1,6,2}$ | $i_{1,6,3}$ | $i_{1,6,4}$ | $\{i_{2,4,l}\}_{l=1,\ldots,v}$ | $\{i_{2,5,l}\}_{l=1,\ldots,v}$ | $\{i_{2,7,l}\}_{l=1,\ldots,v}$ |
|---|---|---|---|---|---|---|
| Rank = 1, $N_3 \leq 19$ | N/A | N/A | N/A | $3(K^{NZ} - 1)$ | $4(K^{NZ} - 1)$ | $2LM_1$ |
| Rank = 2, $N_3 \leq 19$ | $\left\lceil \log_2 \binom{N_3 - 1}{M_2 - 1} \right\rceil$ | N/A | N/A | $3(K^{NZ} - 2)$ | $4(K^{NZ} - 2)$ | $4LM_2$ |
| Rank = 3, $N_3 \leq 19$ | $\left\lceil \log_2 \binom{N_3 - 1}{M_3 - 1} \right\rceil$ | $\left\lceil \log_2 \binom{N_3 - 1}{M_3 - 1} \right\rceil$ | N/A | $3(K^{NZ} - 3)$ | $4(K^{NZ} - 3)$ | $6LM_3$ |
| Rank = 4, $N_3 \leq 19$ | $\left\lceil \log_2 \binom{N_3 - 1}{M_4 - 1} \right\rceil$ | $\left\lceil \log_2 \binom{N_3 - 1}{M_4 - 1} \right\rceil$ | $\left\lceil \log_2 \binom{N_3 - 1}{M_4 - 1} \right\rceil$ | $3(K^{NZ} - 4)$ | $4(K^{NZ} - 4)$ | $8LM_4$ |
| Rank = 1, $N_3 > 19$ | N/A | N/A | N/A | $3(K^{NZ} - 1)$ | $4(K^{NZ} - 1)$ | $2LM_1$ |
| Rank = 2, $N_3 > 19$ | $\left\lceil \log_2 \binom{2M_2 - 1}{M_2 - 1} \right\rceil$ | N/A | N/A | $3(K^{NZ} - 2)$ | $4(K^{NZ} - 2)$ | $4LM_2$ |
| Rank = 3, $N_3 > 19$ | $\left\lceil \log_2 \binom{2M_3 - 1}{M_3 - 1} \right\rceil$ | | N/A | $\left\lceil \log_2 \binom{2M_3 - 1}{M_3 - 1} \right\rceil$ $3(K^{NZ} - 3)$ | $4(K^{NZ} - 3)$ | $6LM_3$ |

TABLE 10-continued

| | PMI of codebook Type = typeIIr16 | | | | | |
|---|---|---|---|---|---|---|
| Rank = 4 $N_3 > 19$ | $\left\lceil \log_2 \binom{2M_4-1}{M_4-1} \right\rceil$ | $\left\lceil \log_2 \binom{2M_4-1}{M_4-1} \right\rceil$ | $\left\lceil \log_2 \binom{2M_4-1}{M_4-1} \right\rceil$ | $3(K^{NZ}-4)$ | $4(K^{NZ}-4)$ | $8LM_4$ |

Note: the bitwidth for $\{i_{1,7,l}\}_{l=1,...,v}$, $\{i_{2,4,l}\}_{l=1,...,v}$ and $\{i_{2,5,l}\}_{l=1,...,v}$ shown in TABLE 10 is the total bitwidth of $\{i_{1,7,l}\}$, $\{i_{2,4,l}\}$ and $\{i_{2,5,l}\}$ up to Rank = $v$, respectively, and the corresponding per layer bitwidths are $2LM_v$, $3(K_l^{NZ}-1)$, and $4(K_l^{NZ}-1)$, (i.e., 1, 3, and 4 bits for each respective indicator elements $k_{l,i,f}^{(3)}$, $k_{l,i,f}^{(2)}$, and $c_{l,i,f}$, respectively), where $K_l^{NZ}$ as defined in Clause 5.2.2.2.5 in [REF8] is the number of nonzero coefficients for layer l such that $K^{NZ} = \Sigma_{l=1}^{v} K_l^{NZ}$.

The bitwidth for PMI of codebookType=typeIIr16PortSelection is provided in Table 11, where the values of $P_{CSI-RS}$, d, L, $K_{NZ,TOT}$, $N_3$, R, $\beta$, $y_0$ and $v_0$ are given by Subclause 5.2.2.2.6 in [REF8].

TABLE 11

| | PMI of codebook Type = typeIIr16PortSelection | | | | |
|---|---|---|---|---|---|
| | Information fields $X_1$ for PMI (for group G0) | | | | |
| | $i_{1,1}$ | $i_{1,8,1}$ | $i_{1,8,2}$ | $i_{1,8,3}$ | $i_{1,8,4}$ |
| Rank = 1 | $\left\lceil \log_2 \left\lceil \frac{P_{CSI-RS}}{2d} \right\rceil \right\rceil$ | $\lceil \log_2 K^{NZ} \rceil$ | N/A | N/A | N/A |
| Rank = 2 | $\left\lceil \log_2 \left\lceil \frac{P_{CSI-RS}}{2d} \right\rceil \right\rceil$ | $\lceil \log_2(2L) \rceil$ | $\lceil \log_2(2L) \rceil$ | N/A | N/A |
| Rank = 3 | $\left\lceil \log_2 \left\lceil \frac{P_{CSI-RS}}{2d} \right\rceil \right\rceil$ | $\lceil \log_2(2L) \rceil$ | $\lceil \log_2(2L) \rceil$ | $\lceil \log_2(2L) \rceil$ | N/A |
| Rank = 4 | $\left\lceil \log_2 \left\lceil \frac{P_{CSI-RS}}{2d} \right\rceil \right\rceil$ | $\lceil \log_2(2L) \rceil$ | $\lceil \log_2(2L) \rceil$ | $\lceil \log_2(2L) \rceil$ | $\lceil \log_2(2L) \rceil$ |

| | Information fields $X_2$ | | | | | |
|---|---|---|---|---|---|---|
| | $i_{2,3,1}$ | $i_{2,3,2}$ | $i_{2,3,3}$ | $i_{2,3,4}$ | $i_{1,5}$ | $i_{1,6,1}$ |
| Rank = 1 $N_3 \leq 19$ | 4 | N/A | N/A | N/A | N/A | $\left\lceil \log_2 \binom{N_3-1}{M_1-1} \right\rceil$ |
| Rank = 2 $N_3 \leq 19$ | 4 | 4 | N/A | N/A | N/A | $\left\lceil \log_2 \binom{N_3-1}{M_2-1} \right\rceil$ |
| Rank = 3 $N_3 \leq 19$ | 4 | 4 | 4 | N/A | N/A | $\left\lceil \log_2 \binom{N_3-1}{M_3-1} \right\rceil$ |
| Rank = 4 $N_3 \leq 19$ | 4 | 4 | 4 | 4 | N/A | $\left\lceil \log_2 \binom{N_3-1}{M_4-1} \right\rceil$ |
| Rank = 1 $N_3 < 19$ | 4 | N/A | N/A | N/A | $\lceil \log_2(2M_1) \rceil$ | $\left\lceil \log_2 \binom{2M_1-1}{M_1-1} \right\rceil$ |
| Rank = 2 $N_3 < 19$ | 4 | 4 | N/A | N/A | $\lceil \log_2(2M_2) \rceil$ | $\left\lceil \log_2 \binom{2M_2-1}{M_2-1} \right\rceil$ |
| Rank = 3 $N_3 < 19$ | 4 | 4 | 4 | N/A | $\lceil \log_2(2M_3) \rceil$ | $\left\lceil \log_2 \binom{2M_3-1}{M_3-1} \right\rceil$ |
| Rank = 4 $N_3 < 19$ | 4 | 4 | 4 | 4 | $\lceil \log_2(2M_4) \rceil$ | $\left\lceil \log_2 \binom{2M_4-1}{M_4-1} \right\rceil$ |

| | Information fields $X_2$ | | | | | |
|---|---|---|---|---|---|---|
| | $i_{1,6,2}$ | $i_{1,6,3}$ | $i_{1,6,4}$ | $\{i_{2,4,l}\}_{l=1,...,v}$ | $\{i_{2,5,l}\}_{l=1,...,v}$ | $\{i_{2,7,l}\}_{l=1,...,v}$ |
| Rank = 1 $N_3 \leq 19$ | N/A | N/A | N/A | $3(K^{NZ}-1)$ | $4(K^{NZ}-1)$ | $2LM_1$ |
| Rank = 2 $N_3 > 19$ | $\left\lceil \log_2 \binom{N_3-1}{M_2-1} \right\rceil$ | N/A | N/A | $3(K^{NZ}-2)$ | $4(K^{NZ}-2)$ | $4LM_2$ |
| Rank = 3 $N_3 > 19$ | $\left\lceil \log_2 \binom{N_3-1}{M_3-1} \right\rceil$ | $\left\lceil \log_2 \binom{N_3-1}{M_3-1} \right\rceil$ | N/A | $3(K^{NZ}-3)$ | $4(K^{NZ}-3)$ | $6LM_3$ |
| Rank = 4 $N_3 > 19$ | $\left\lceil \log_2 \binom{N_3-1}{M_4-1} \right\rceil$ | $\left\lceil \log_2 \binom{N_3-1}{M_4-1} \right\rceil$ | $\left\lceil \log_2 \binom{N_3-1}{M_4-1} \right\rceil$ | $3(K^{NZ}-4)$ | $4(K^{NZ}-4)$ | $8LM_4$ |

TABLE 11-continued

PMI of codebook Type = typeIIr16PortSelection

| | | | | | | |
|---|---|---|---|---|---|---|
| Rank = 1<br>$N_3 < 19$ | N/A | N/A | N/A | $3(K^{NZ} - 1)$ | $4(K^{NZ} - 1)$ | $2LM_1$ |
| Rank = 2<br>$N_3 < 19$ | $\left\lceil \log_2 \binom{2M_2 - 1}{M_2 - 1} \right\rceil$ | N/A | N/A | $3(K^{NZ} - 2)$ | $4(K^{NZ} - 2)$ | $4LM_2$ |
| Rank = 3<br>$N_3 < 19$ | $\left\lceil \log_2 \binom{2M_3 - 1}{M_3 - 1} \right\rceil$ | $\left\lceil \log_2 \binom{2M_3 - 1}{M_3 - 1} \right\rceil$ | N/A | $3(K^{NZ} - 3)$ | $4(K^{NZ} - 3)$ | $6LM_3$ |
| Rank = 4<br>$N_3 < 19$ | $\left\lceil \log_2 \binom{2M_4 - 1}{M_4 - 1} \right\rceil$ | $\left\lceil \log_2 \binom{2M_4 - 1}{M_4 - 1} \right\rceil$ | $\left\lceil \log_2 \binom{2M_4 - 1}{M_4 - 1} \right\rceil$ | $3(K^{NZ} - 4)$ | $4(K^{NZ} - 4)$ | $8LM_4$ |

Note: the bitwidth for $\{i_{1,7,l}\}_{l=1,...,v}$, $\{i_{2,4,l}\}_{l=1,...,v}$ and $\{i_{2,5,l}\}_{l=1,...,v}$ shown in TABLE 11 is the total bitwidth of $\{i_{1,7,l}\}$, $\{i_{2,4,l}\}$ and $\{i_{2,5,l}\}$ up to Rank = v, respectively, and the corresponding per layer bitwidths are $2LM_v$, $3(K_l^{NZ} - 1)$, and $4(K_l^{NZ} - 1)$, (i.e., 1, 3, and 4 bits for each respective indicator elements $k_{l,i,f}^{(3)}$, $k_{l,i,f}^{(2)}$, and $c_{l,i,f}$, respectively), where $K_l^{NZ}$ as defined in Clause 5.2.2.2.6 in [REF8] is the number of nonzero coefficients for layer l such that $K^{NZ} = \Sigma_{l=1}^{v} K_l^{NZ}$.

For CSI on PUSCH, two UCI bit sequences are generated, $a_0^{(1)}$, $a_1^{(1)}$, $a_2^{(1)}$, $a_3^{(1)}$, ..., $a_{A^{(1)}-1}^{(1)}$ and $a_0^{(2)}$, $a_1^{(2)}$, $a_2^{(2)}$, $a_3^{(2)}$, ..., $a_{A^{(2)}-1}^{(2)}$. The CSI fields of all CSI reports, in the order from upper part to lower part in Table 6.3.2.1.2-6 [REF7], are mapped to the UCI bit sequence $a_0^{(1)}$, $a_1^{(1)}$, $a_2^{(1)}$, $a_3^{(1)}$, ..., $a_{A^{(1)}-1}^{(1)}$ starting with $a_0^{(1)}$. The CSI fields of all CSI reports, in the order from upper part to lower part in Table 12, are mapped to the UCI bit sequence $a_0^{(2)}$, $a_1^{(2)}$, $a_2^{(2)}$, $a_3^{(2)}$, ..., $a_{A^{(2)}-1}^{(2)}$ starting with $a_0^{(2)}$.

TABLE 12

Mapping order of CSI reports to UCI bit sequence $\alpha_0^{(2)}$, $\alpha_1^{(2)}$, $\alpha_2^{(2)}$, $\alpha_3^{(2)}$, ..., $\alpha_{A^{(2)}-1}^{(2)}$, with two-part CSI report(s)

| UCI bit sequence | CSI report number |
|---|---|
| $\alpha_0^{(2)}$ | CSI report #1 with Group 0, as in Table 13, |
| $\alpha_1^{(2)}$ | or CSI part 2 wideband, as in Table 6.3.2.1.2-4 |
| $\alpha_2^{(2)}$ | [REF7], |
| $\alpha_3^{(2)}$ | if CSI part 2 exists for CSI report #1 |
| . | CSI report #2 with Group 0, as in Table 13, |
| . | or CSI part 2 wideband, as in Table 6.3.2.1.2-4 |
| . | [REF7], |
| $\alpha_{A^{(2)}-1}^{(2)}$ | if CSI part 2 exists for CSI report #2 |
| | ... |
| | CSI report #n with Group 0, as in Table 13, |
| | or CSI part 2 wideband, as in Table 6.3.2.1.2-4 |
| | [REF7], |
| | if CSI part 2 exists for CSI report #n |
| | CSI report #1 with Group 1 and Group 2, as in Table 13, or CSI part 2 subband, as in Table 6.3.2.1.2-5 [REF7], |
| | if CSI part 2 exists for CSI report #1 |
| | CSI report #2 with Group 1 and Group 2, as in Table 13, or CSI part 2 subband, as in Table 6.3.2.1.2-5 [REF7], |
| | if CSI part 2 exists for CSI report #2 |
| | ... |
| | CSI report #n with Group 1 and Group 2, as in Table 13, or CSI part 2 subband, as in Table 6.3.2.1.2-5 [REF7], |
| | if CSI part 2 exists for CSI report #n | where CSI report #1, CSI report #2, ..., CSI report #n in Table 6.3.2.1.2-7 correspond to the CSI reports in increasing order of CSI report priority values according to Subclause 5.2.5 of [REF8].

TABLE 13

Mapping order of CSI fields of one CSI report, CSI part 2 of codebookType = typeII-r16 or typeII-PortSelection-r16

| CSI report number | CSI fields |
|---|---|
| CSI report #n CSI part 2, group 0 | PMI fields $X_1$, from left to right as in Table 10/ Table 11, if reported |
| CSI report #n CSI part 2, group 1 | The following PMI fields $X_2$, from left to right, as in Table 10/Table 11: $\{i_{2,3,l}: l = 1, ..., v\}$, $i_{1,5}$, $\{i_{1,6,l}: l = 1, ..., v\}$ and $\left(\left\lceil \frac{K^{NZ}}{2} \right\rceil - v\right) \times 3$ highest priority bits of $\{i_{2,4,l}: l = 1, ..., v\}$, $(\lceil K^{NZ}/2 \rceil - v) \times 4$ highest priority bits of $\{i_{2,5,l}: l = 1, ..., v\}$ and $v * 2LM_v - \lfloor K^{NZ}/2 \rfloor$ highest priority bits of $\{i_{1,7,l}: l = 1, ..., v\}$, in decreasing order of priority based on function Pri(l, i, f) defined in clause 5.2.3 of TS38.214, if reported |
| CSI report #n CSI part 2, group 2 | The following PMI fields $X_2$, from left to right, as in Table 10/Table 11: $\lfloor K^{NZ}/2 \rfloor \times 3$ lowest priority bits of $\{i_{2,4,l}: l = 1, ..., v\}$, $\lfloor K^{NZ}/2 \rfloor \times 4$ lowest priority bits of $(i_{2,5,l}: l = 1, ..., v\}$ and $\lfloor K^{NZ}/2 \rfloor$ lowest priority bits of $(i_{1,7,l}: l = 1, ..., v\}$, in decreasing order of priority based on function Pri(l, i, f) defined in clause 5.2.3 of TS38.214, if reported |

According to Section 5.2.1.4 of [REF8], for CSI reporting, a UE can be configured via higher layer signaling with one out of two possible subband sizes, where a subband is defined as $N_{PRB}^{SB}$ contiguous PRBs and depends on the total number of PRBs in the bandwidth part according to Table 14. Let $N_{SB}$ be the number of subbands in csi-ReportingBand configured to the UE for the CSI reporting. According to Table 14, $N_{SB}$ can take a value from $\{3, 4, ..., 19\}$.

TABLE 14

Configurable subband sizes

| Bandwidth part (PRBs) | Subband size (PRBs) |
|---|---|
| <24 | N/A |
| 24-72 | 4, 8 |
| 73-144 | 8, 16 |
| 145-275 | 16, 32 |

The precoding matrices indicated by the PMI are determined from $L+M_v$ vectors, where L is the number of spatial domain (SD) basis vectors, $M_v$ is the number of frequency domain (FD) basis vectors, given by $$M_v = \left\lceil p_v \frac{N_3}{R} \right\rceil.$$

And the upper bound on the number of non-zero (NZ) coefficients that the UE can report for each layer is given by $K_0 = \lceil \beta 2LM_1 \rceil$ such that $K_l^{NZ} \leq K_0$ is the number of nonzero coefficients for layer $l=1, \ldots, \upsilon$ and $K^{NZ} = \Sigma_{l=1}^{\upsilon} K_l^{NZ} \leq 2K_0$ is the total number of nonzero coefficients. The $K_0$ values for $M_1=1, 2, 3$ and different paramCombination-r16 values is shown in Table 15.

TABLE 15

| paramCombination-r16 | L | $p_v$ $v \in \{1, 2\}$ | $v \in (3, 4)$ | β | $K_0$ $M_1 = 1$ | $M_1 = 2$ | $M_1 = 3$ |
|---|---|---|---|---|---|---|---|
| 1 | 2 | ¼ | ⅛ | ¼ | 1 | 2 | 3 |
| 2 | 2 | ¼ | ⅛ | ½ | 2 | 4 | 6 |
| 3 | 4 | ¼ | ⅛ | ¼ | 2 | 4 | 6 |
| 4 | 4 | ¼ | ⅛ | ½ | 4 | 8 | 12 |
| 5 | 4 | ¼ | ¼ | ¾ | 6 | 12 | 18 |
| 6 | 4 | ½ | ¼ | ½ | 4 | 8 | 12 |
| 7 | 6 | ¼ | — | ½ | 6 | 12 | 18 |
| 8 | 6 | ¼ | — | ¾ | 9 | 18 | 27 |

As shown in bold in Table 15, when $M_1=1$, 2 and paramCombination-r16=1, 2, 3, then $K_0$ can be so small (e.g., 1 or 2) that that there is not sufficient number of NZ coefficients (i.e., 2 NZ coefficients per layer) to report a PMI. In particular, we can have the following cases.

Case 1: $K_0=1$ when $N_{SB}=3$, 4 and paramCombination-r16=1, and

Case 2: $K_0=2$ when $N_{SB}=5$, 6, 7, 8 and paramCombination-r16=1, 2, 3.

With Case 1, $K_0=1$ (implying that $K^{NZ}=1$ for rank 1 and $K^{NZ}=2$ for rank 2), and if the UE reports rank 2 (i.e., $\upsilon=2$), only SCIs ($i_{1,8}$) are reported for the two layers, and amplitudes and phases (i.e., $i_{2,4}$ and $i_{2,5}$) are not reported for either layer. This implies that the bitwidths for $i_{2,4}$ and $i_{2,5}$ reporting in group 1 and group 2 should be zero. However, according to Table 13, since the value of the term $$\left\lceil \frac{K^{NZ}}{2} \right\rceil - \upsilon$$

in group 1 equals −1, and the value of the term $\lfloor K^{NZ}/2 \rfloor$ in group 2 equals 1, the bitwidths for $i_{2,4}$ and $i_{2,5}$ reporting in group 1 and group 2 are not zero. We have a similar issue with Case 2 ($K_0=2$) and if the UE reports rank 3-4.

So, the term $$\left\lceil \frac{K^{NZ}}{2} \right\rceil - \upsilon$$

in group 1 and the term $\lfloor K^{NZ}/2 \rfloor$ in group 2 needs to be replaced such that they are zero for the two cases mentioned above. In the rest of the disclosure, several example embodiments are provided to achieve this.

Component 6—CSI Reporting Based on Rel. 16 Enhanced Type II for Small Number of SBs In embodiment 6, the term $$\left\lceil \frac{K^{NZ}}{2} \right\rceil - \upsilon$$

in group 1 for bits of $\{i_{2,4,l}: l=1, \ldots, \upsilon\}$, and the term $\lfloor K^{NZ}/2 \rfloor$ in group 2 for bits of $\{i_{2,5,l}: l=1, \ldots, \upsilon\}$ are replaced with $T_1$ and $T_2$ respectively such that $T_1$ and $T_2$ are zero when amplitudes and phases (i.e., $i_{2,4}$ and $i_{2,5}$) are not reported for any layer value $l=1, \ldots \upsilon$. The group 1 and group 2 after this replacement are given as in Table 16.

TABLE 16

Mapping order of CSI fields of one CSI report, CSI part 2 of codebookType = typeII-r16 or typeII-PortSelection-r16

| CSI report number | CSI fields |
|---|---|
| CSI report #n CSI part 2, group 0 | PMI fields $X_1$, from left to right as in Table 10/Table 11, if reported |
| CSI report #n CSI part 2, group 1 | The following PMI fields $X_2$, from left to right, as in Table 10/Table 11: $\{i_{2,3,l}: l=1, \ldots, \upsilon\}$, $i_{1,5}$, $\{i_{1,6,l}: l=1, \ldots, \upsilon\}$ and $(T_1) \times 3$ highest priority bits of $\{i_{2,4,l}: l=1, \ldots, \upsilon\}$, $(T_1) \times 4$ highest priority bits of $\{i_{2,5,l}: l=1, \ldots, \upsilon\}$ and $v * 2LM_\upsilon - \lfloor K^{NZ}/2 \rfloor$ highest priority bits of $\{i_{1,7,l}: l=1, \ldots, \upsilon\}$, in decreasing order of priority based on function Pri(l, i, f) defined in clause 5.2.3 of TS38.214, if reported |
| CSI report #n CSI part 2, group 2 | The following PMI fields $X_2$, from left to right, as in Table 10/Table 11: $T_2 \times 3$ lowest priority bits of $(i_{2,4,l}: l=1, \ldots, \upsilon\}$, $T_2 \times 4$ lowest priority bits of $\{i_{2,5,l}: l=1, \ldots, \upsilon\}$ and $\lfloor K^{NZ}/2 \rfloor$ lowest priority bits of $\{i_{1,7,l}: l=1, \ldots, \upsilon\}$, in decreasing order of priority based on function Pri(l, i, f) defined in clause 5.2.3 of TS38.214, if reported |

At least one of the following examples is used or configured for $(T_1, T_2)$.

In one example 6.1, $$T_1 = \left\lceil \frac{K^{NZ} - \upsilon}{2} \right\rceil \text{ and } T_2 = \left\lfloor \frac{K^{NZ} - \upsilon}{2} \right\rfloor.$$

In one example 6.2, $$T_2 = \left\lceil \frac{K^{NZ} - \upsilon}{2} \right\rceil \text{ and } T_1 = \left\lfloor \frac{K^{NZ} - \upsilon}{2} \right\rfloor.$$

In one example 6.3, $$T_1 = \left\lceil \frac{K^{NZ}}{2} \right\rceil - \left\lceil \frac{v}{2} \right\rceil \text{ and } T_2 = \left\lfloor \frac{K^{NZ}}{2} \right\rfloor - \left\lfloor \frac{v}{2} \right\rfloor.$$

In one example 6.4, $$T_1 = \left\lceil \frac{K^{NZ}}{2} \right\rceil - \left\lfloor \frac{v}{2} \right\rfloor \text{ and } T_2 = \left\lfloor \frac{K^{NZ}}{2} \right\rfloor - \left\lceil \frac{v}{2} \right\rceil.$$

In one example 6.5, $$T_2 = \left\lceil \frac{K^{NZ}}{2} \right\rceil - \left\lceil \frac{v}{2} \right\rceil \text{ and } T_1 = \left\lfloor \frac{K^{NZ}}{2} \right\rfloor - \left\lfloor \frac{v}{2} \right\rfloor.$$

In one example 6.6, $$T_2 = \left\lceil \frac{K^{NZ}}{2} \right\rceil - \left\lfloor \frac{v}{2} \right\rfloor \text{ and } T_1 = \left\lfloor \frac{K^{NZ}}{2} \right\rfloor - \left\lceil \frac{v}{2} \right\rceil.$$

In one example 6.7, $$T_1 = \max\left(0, \left\lceil \frac{K^{NZ}}{2} \right\rceil - v\right) \text{ and } T_2 = \left\lfloor \frac{K^{NZ}}{2} \right\rfloor + \min\left(0, \left\lceil \frac{K^{NZ}}{2} \right\rceil - v\right).$$

In one example 6.8, $$T_1 = \max\left(0, \left\lfloor \frac{K^{NZ}}{2} \right\rfloor - v\right) \text{ and } T_2 = \left\lceil \frac{K^{NZ}}{2} \right\rceil + \min\left(0, \left\lfloor \frac{K^{NZ}}{2} \right\rfloor - v\right).$$

In one example 6.9, $$T_2 = \max\left(0, \left\lceil \frac{K^{NZ}}{2} \right\rceil - v\right) \text{ and } T_1 = \left\lfloor \frac{K^{NZ}}{2} \right\rfloor + \min\left(0, \left\lceil \frac{K^{NZ}}{2} \right\rceil - v\right).$$

In one example 6.10, $$T_2 = \max\left(0, \left\lfloor \frac{K^{NZ}}{2} \right\rfloor - v\right) \text{ and } T_1 = \left\lceil \frac{K^{NZ}}{2} \right\rceil + \min\left(0, \left\lfloor \frac{K^{NZ}}{2} \right\rfloor - v\right).$$

Any of the above variation embodiments can be utilized independently or in combination with at least one other variation embodiment.

Figure 14:
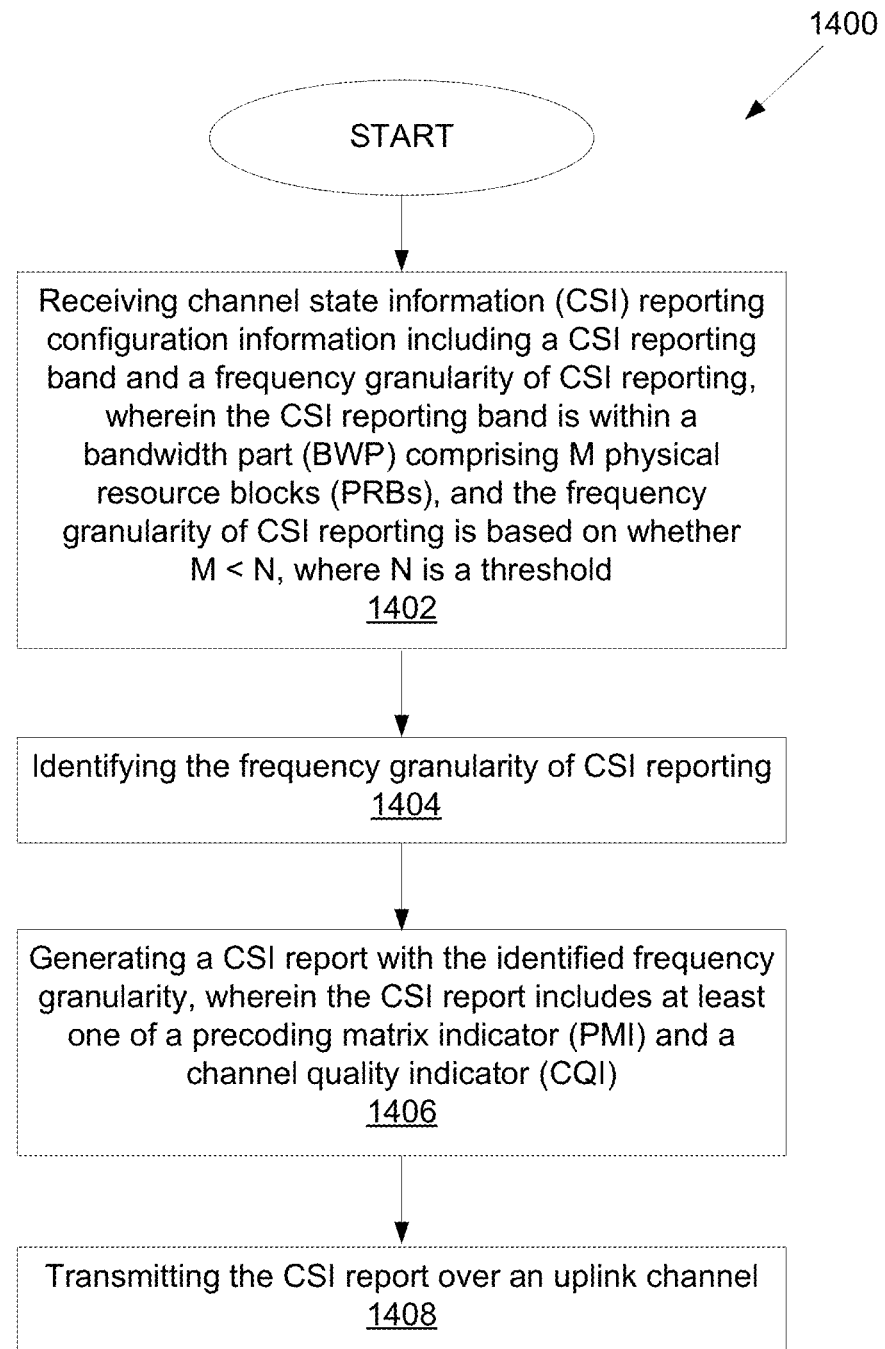
FIG. 14 illustrates a flow chart of a method for operating a UE according to embodiments of the present disclosure.

FIG. 14 illustrates a flow chart of a method 1400 for operating a user equipment (UE), as may be performed by a UE such as UE 116, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the UE (e.g., 111-116 as illustrated in FIG. 1) receives channel state information (CSI) reporting configuration information including a CSI reporting band and a frequency granularity of CSI reporting, wherein the CSI reporting band is within a bandwidth part (BWP) comprising M physical resource blocks (PRBs), and the frequency granularity of CSI reporting is based on whether M<N, where N is a threshold.

In step 1404, the UE, based on the CSI reporting configuration information, identifies the frequency granularity of CSI reporting.

In step 1406, the UE generates a CSI report with the identified frequency granularity, wherein the CSI report includes at least one of a precoding matrix indicator (PMI) and a channel quality indicator (CQI).

In step 1408, the UE transmits the CSI report over an uplink (UL) channel.

In one embodiment, N=24.

In one embodiment, when M<N, the frequency granularity of CSI reporting is fixed to wideband, indicating that the CSI report includes either one PMI or one CQI or one PMI and one CQI for an entire CSI reporting band.

In one embodiment, a codebook for generating the CSI report is a Type 1, single panel codebook.

In one embodiment, when M<N the frequency granularity of CSI reporting is either wideband or subband: wideband indicating that the CSI report includes either one PMI or one CQI or one PMI and one CQI for an entire CSI reporting band, and subband indicating that the CSI report includes either one PMI or one CQI or one PMI and one CQI for each subband in the CSI reporting band, where a subband of size k corresponds to k contiguous PRBs.

In one embodiment, the subband size k is fixed.

In one embodiment, the subband size k is configured via higher layer signaling.

In one embodiment, when M<N, the frequency granularity of CSI reporting is based on capability information reported by the UE, where the frequency granularity is either wideband or subband when the capability information indicates that the UE supports subband CSI reporting; and the frequency granularity is wideband only when the capability information indicates that the UE does not support subband CSI reporting.

In one embodiment, when M<N, the frequency granularity of CSI reporting is wideband only, and when M>=N, the frequency granularity of CSI reporting is either wideband or subband.

Figure 15:
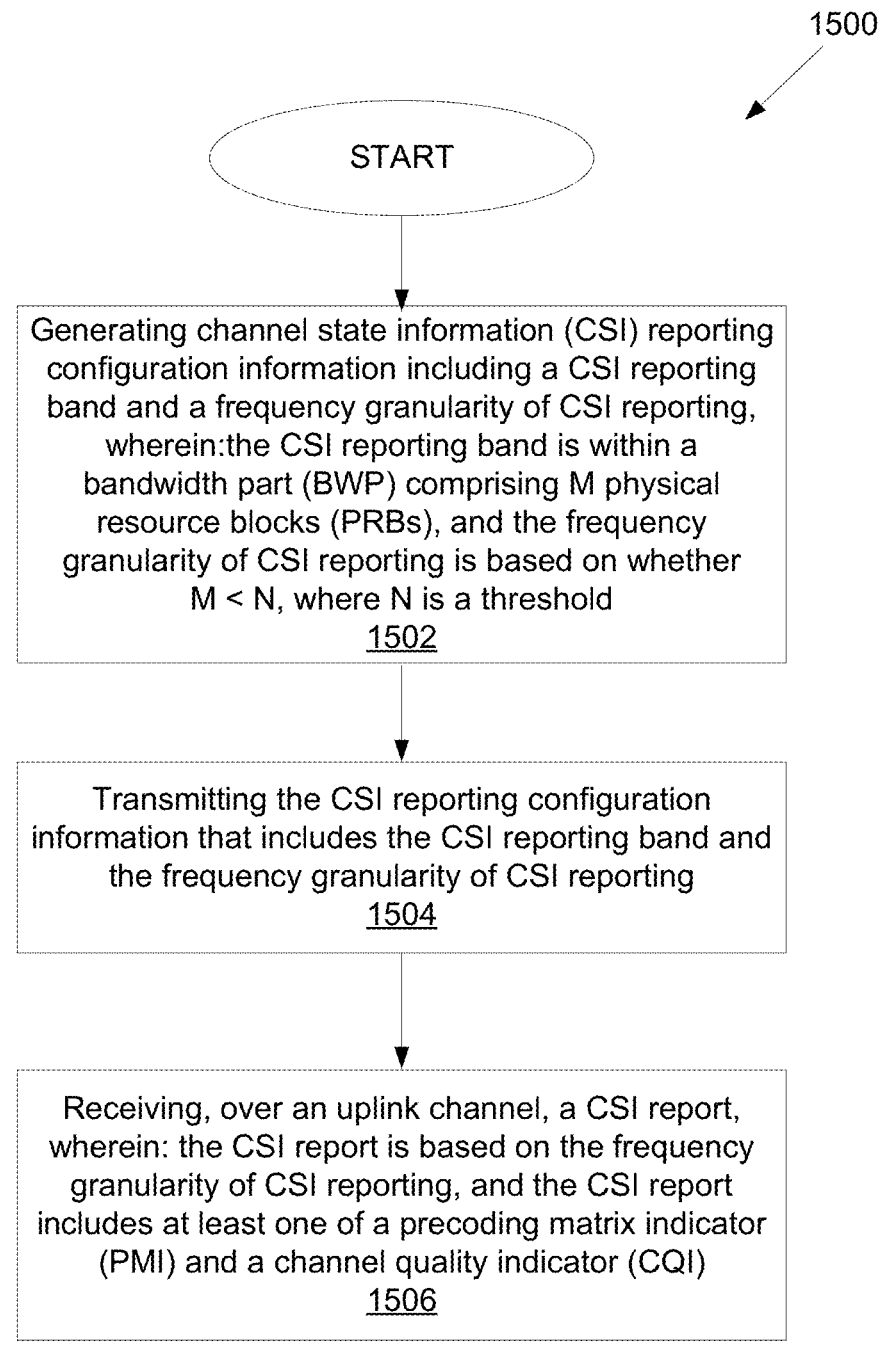
FIG. 15 illustrates a flow chart of a method for operating a BS according to embodiments of the present disclosure.

FIG. 15 illustrates a flow chart of another method 1500, as may be performed by a base station (BS) such as BS 102, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), generates channel state information (CSI) reporting configuration information including a CSI reporting band and a frequency granularity of CSI reporting, wherein: the CSI reporting band is within a bandwidth part (BWP) comprising M physical resource blocks (PRBs), and the frequency granularity of CSI reporting is based on whether M<N, where N is a threshold.

In step 1504, the BS transmits the CSI reporting configuration information that includes the CSI reporting band and the frequency granularity of CSI reporting.

In step 1506, the BS receives, over an uplink (UL) channel, a CSI report; wherein: the CSI report is based on the frequency granularity of CSI reporting, and the CSI report includes at least one of a precoding matrix indicator (PMI) and a channel quality indicator (CQI).

In one embodiment, N=24.

In one embodiment, when M<N, the frequency granularity of CSI reporting is fixed to wideband, indicating that the CSI report includes either one PMI or one CQI or one PMI and one CQI for an entire CSI reporting band.

In one embodiment, a codebook for generating the CSI report is a Type 1, single panel codebook.

In one embodiment, when M<N the frequency granularity of CSI reporting is either wideband or subband: wideband indicating that the CSI report includes either one PMI or one CQI or one PMI and one CQI for an entire CSI reporting band, and subband indicating that the CSI report includes either one PMI or one CQI or one PMI and one CQI for each subband in the CSI reporting band, where a subband of size k corresponds to k contiguous PRBs.

In one embodiment, the subband size k is fixed.

In one embodiment, the subband size k is configured via higher layer signaling.

In one embodiment, when M<N, the frequency granularity of CSI reporting is based on capability information reported by the UE, where the frequency granularity is either wideband or subband when the capability information indicates that the UE supports subband CSI reporting; and the frequency granularity is wideband only when the capability information indicates that the UE does not support subband CSI reporting.

In one embodiment, when M<N, the frequency granularity of CSI reporting is wideband only, and when M>=N, the frequency granularity of CSI reporting is either wideband or subband.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive channel state information (CSI) reporting configuration information including a CSI reporting band and a frequency granularity of CSI reporting, wherein
the CSI reporting band is within a bandwidth part (BWP) comprising a number of physical resource blocks (PRBs), and
the frequency granularity of CSI reporting is based on whether the number of PRBs is less than 24; and
a processor operably coupled to the transceiver, the processor, based on the CSI reporting configuration information, configured to:
identify the frequency granularity of CSI reporting, and
generate a CSI report with the identified frequency granularity, wherein the CSI report includes at least one of a precoding matrix indicator (PMI) and a channel quality indicator (CQI),
wherein the transceiver is further configured to transmit the CSI report over an uplink (UL) channel.

2. The UE of claim 1, wherein when the number of PRBs is less than 24, the frequency granularity of CSI reporting is fixed to wideband.

3. The UE of claim 1, wherein a codebook for generating the CSI report is a Type 1, single panel codebook.

4. The UE of claim 1, wherein when the number of PRBs is less than 24, the frequency granularity of CSI reporting is either wideband or subband:
wideband indicating that the CSI report includes either one PMI or one CQI or one PMI and one CQI for an entire CSI reporting band, and
subband indicating that the CSI report includes either one PMI or one CQI or one PMI and one CQI for each subband in the CSI reporting band, where a subband of size k corresponds to k contiguous PRBs.

5. The UE of claim 4, wherein the subband size k is fixed.

6. The UE of claim 4, wherein the subband size k is configured via higher layer signaling.

7. The UE of claim 1, wherein when the number of PRBs is less than 24, the frequency granularity of CSI reporting is based on capability information reported by the UE,
the frequency granularity is either wideband or subband when the capability information indicates that the UE supports subband CSI reporting; and
the frequency granularity is wideband only when the capability information indicates that the UE does not support subband CSI reporting.

8. The UE of claim 1, wherein when the number of PRBs is less than 24, the frequency granularity of CSI reporting is wideband only, and when the number of PRBs >=24, the frequency granularity of CSI reporting is either wideband or subband.

9. A base station (BS) comprising: a processor configured to generate channel state information (CSI) reporting configuration information including a CSI reporting band and a frequency granularity of CSI reporting, wherein:
the CSI reporting band is within a bandwidth part (BWP) comprising a number of physical resource blocks (PRBs), and the frequency granularity of CSI reporting is based on whether the number of PRBs is less than 24; and
a transceiver operably coupled to the processor, the transceiver configured to:
transmit the CSI reporting configuration information that includes the CSI reporting band and the frequency granularity of CSI reporting; and
receive, over an uplink (UL) channel, a CSI report; wherein:
the CSI report is based on the frequency granularity of CSI reporting, and
the CSI report includes at least one of a precoding matrix indicator (PMI) and a channel quality indicator (CQI).

10. The BS of claim 9, wherein when the number of PRBs is less than 24, the frequency granularity of CSI reporting is fixed to wideband.

11. The BS of claim 10, wherein a codebook for generating the CSI report is a Type 1, single panel codebook.

12. The BS of claim 9, wherein when the number of PRBs is less than 24, the frequency granularity of CSI reporting is either wideband or subband:
wideband indicating that the CSI report includes either one PMI or one CQI or one PMI and one CQI for an entire CSI reporting band, and subband indicating that the CSI report includes either one PMI or one CQI or one PMI and one CQI for each subband in the CSI reporting band, where a subband of size k corresponds to k contiguous PRBs.

13. The BS of claim 12, wherein the subband size k is fixed.

14. The BS of claim 12, wherein the subband size k is configured via higher layer signaling.

15. The BS of claim 9, wherein when the number of PRBs is less than 24, the frequency granularity of CSI reporting is based on capability information reported by a user equipment (UE),
   the frequency granularity is either wideband or subband when the capability information indicates that the UE supports subband CSI reporting; and
   the frequency granularity is wideband only when the capability information indicates that the UE does not support subband CSI reporting.

16. The BS of claim 9, wherein when the number of PRBs is less than 24, the frequency granularity of CSI reporting is wideband only, and when the number of PRBs is >=24, the frequency granularity of CSI reporting is either wideband or subband.

17. A method for operating a user equipment (UE), the method comprising:
   receiving channel state information (CSI) reporting configuration information including a CSI reporting band and a frequency granularity of CSI reporting, wherein the CSI reporting band is within a bandwidth part (BWP) comprising a number of physical resource blocks (PRBs), and
   the frequency granularity of CSI reporting is based on whether the number of PRBs is less than 24;
   identifying the frequency granularity of CSI reporting;
   generating a CSI report with the identified frequency granularity, wherein the CSI report includes at least one of a precoding matrix indicator (PMI) and a channel quality indicator (CQI); and
   transmitting the CSI report over an uplink (UL) channel.

18. The UE of claim 2, wherein when the frequency granularity of CSI reporting is fixed to wideband, the CSI report includes either one PMI or one CQI or one PMI and one CQI for an entire CSI reporting band.

19. The BS of claim 10, wherein when the frequency granularity of CSI reporting is fixed to wideband, the CSI report includes either one PMI or one CQI or one PMI and one CQI for an entire CSI reporting band.

20. The method of claim 17, wherein:
   when the number of PRBs is less than 24, the frequency granularity of CSI reporting is fixed to wideband, and
   when the frequency granularity of CSI reporting is fixed to wideband, the CSI report includes either one PMI or one CQI or one PMI and one CQI for an entire CSI reporting band.

* * * * *